(12) United States Patent
Ching et al.

(10) Patent No.: US 7,097,890 B1
(45) Date of Patent: *Aug. 29, 2006

(54) POLYMER WITH PENDENT CYCLIC OLEFINIC FUNCTIONS FOR OXYGEN SCAVENGING PACKAGING

(75) Inventors: Ta Yen Ching, Novato, CA (US); Joseph L. Goodrich, Lafayette, CA (US); James P. Leonard, San Rafael, CA (US); Kenneth W. Russell, Orange, TX (US)

(73) Assignee: Chevron Phillips Chemical Co. LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/127,316

(22) Filed: Jul. 31, 1998

(51) Int. Cl.
B29D 22/00 (2006.01)
B29D 23/00 (2006.01)
B32B 1/08 (2006.01)

(52) U.S. Cl. ............ 428/36.6; 482/36.7; 482/518; 482/346; 482/35.4; 525/330.6; 525/374

(58) Field of Classification Search ............ 428/35.4, 428/35.2, 36.6, 36.7, 346, 518, 515; 525/330.6, 525/330.3, 370, 371, 372, 384
See application file for complete search history.

(56) References Cited

U.S. PATENT DOCUMENTS

| | | | |
|---|---|---|---|
| 3,497,571 A | 2/1970 | Tellier et al. ............ 260/844 |
| 3,536,687 A | 10/1970 | Nordstrom ............ 260/89.5 |
| 3,632,684 A | 1/1972 | Tellier et al. ............ 260/881 |
| 3,873,644 A * | 3/1975 | Pampus et al. ............ 260/879 |
| 4,415,710 A | 11/1983 | Barnabeo et al. ............ 525/370 |
| 4,524,201 A | 6/1985 | Barnabeo et al. ............ 528/395 |
| 5,116,916 A | 5/1992 | Young ............ 525/350 |
| 5,211,875 A | 5/1993 | Speer et al. ............ 252/188.28 |
| 5,294,689 A | 3/1994 | McCallum, III et al. ..... 526/271 |
| 5,346,644 A | 9/1994 | Speer et al. ............ 252/188.28 |
| 5,399,289 A * | 3/1995 | Speer et al. ............ 252/188.28 |
| 5,425,896 A | 6/1995 | Speer et al. ............ 252/188.28 |
| 5,466,756 A | 11/1995 | Roach et al. ............ 525/330.6 |
| 5,498,364 A | 3/1996 | Speer et al. ............ 252/188.28 |
| 5,627,239 A | 5/1997 | Ching et al. ............ 525/330.6 |
| 5,641,825 A | 6/1997 | Bacskai et al. ............ 524/398 |
| 5,656,692 A | 8/1997 | Hayes ............ 525/63 |
| 5,660,761 A | 8/1997 | Katsumoto et al. ..... 252/188.28 |
| 5,700,554 A | 12/1997 | Speer et al. ............ 428/220 |
| 5,736,616 A * | 4/1998 | Ching et al. ............ 525/330.3 |
| 5,744,246 A * | 4/1998 | Ching ............ 428/474.4 |
| 5,776,361 A | 7/1998 | Katsumoto et al. ..... 252/188.28 |
| 5,837,158 A | 11/1998 | Shepodd et al. ............ 252/181.6 |
| 5,859,145 A * | 1/1999 | Ching et al. ............ 525/330.6 |
| 6,057,013 A | 5/2000 | Ching et al. ............ 428/35.7 |

(Continued)

FOREIGN PATENT DOCUMENTS

DE   1 900 181   10/1969

(Continued)

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1-8 (Chicago, Jun. 19-20, 2000).

(Continued)

*Primary Examiner*—Michael Miggins
(74) *Attorney, Agent, or Firm*—K. Ka Ran Reed

(57) ABSTRACT

A family of polymers containing selected cyclic allylic pendent groups for oxygen scavenging packaging which has minimal organoleptic by-products after oxidation.

83 Claims, 4 Drawing Sheets

U.S. PATENT DOCUMENTS

| | | | | |
|---|---|---|---|---|
| 6,063,307 | A | 5/2000 | Shepodd et al. | 252/181.6 |
| 6,139,770 | A * | 10/2000 | Katsumoto et al. | 252/188.28 |
| 6,333,087 | B1 * | 12/2001 | Jerdee et al. | 428/35.9 |
| 6,437,086 | B1 * | 8/2002 | Ching et al. | 528/272 |
| 6,525,123 | B1 * | 2/2003 | Yang et al. | 524/398 |
| 6,527,976 | B1 * | 3/2003 | Cai et al. | 252/188.28 |
| 6,554,965 | B1 * | 4/2003 | Hartmann et al. | 202/158 |
| 6,610,215 | B1 * | 8/2003 | Cai et al. | 252/188.28 |
| 2002/0102424 | A1 * | 8/2002 | Yang et al. | 428/520 |

FOREIGN PATENT DOCUMENTS

| | | |
|---|---|---|
| EP | 0 040 983 A1 | 12/1981 |
| EP | 0 418 011 A2 | 3/1991 |
| EP | 0 477 983 | 11/1996 |
| JP | 09011416 A * | 1/1997 |
| WO | WO95/02616 | 1/1995 |
| WO | WO96/40799 | 12/1996 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19-20, 2000).

* cited by examiner

POLYMER WITH PENDENT CYCLIC OLEFINIC FUNCTIONS FOR OXYGEN SCAVENGING PACKAGING

FIELD OF THE INVENTION

The present invention relates to compositions for use in areas such as food packaging, and with minimal effect on odor and taste of packaged contents. The invention preferably uses ethylene acrylate copolymers which are modified with selected cyclic olefine pendent groups for use in oxygen scavenging packaging materials.

BACKGROUND OF THE INVENTION

New polymer compositions having properties that are particularly tailored for specific applications are required in response to more specific and sophisticated end uses. It can be difficult to make these compositions directly by polymerization from monomers or via solution esterification or transesterification, but manufacturing them in melt mixing equipment such as an extruder has provided an efficient, economical and viable means to supply increasingly complex polymers to meet the needs in specialized markets.

It is well known that regulating the exposure of oxygen-sensitive products to oxygen maintains and enhances the quality and "shelf-life" of the product. For instance, by limiting the exposure of oxygen sensitive food products to oxygen in a packaging system, the quality or freshness of food is maintained, spoilage reduced and the food shelf life extended. In the food packaging industry, several means for regulating oxygen exposure have already been developed. These means include modified atmosphere packaging (MAP) and oxygen barrier film packaging.

One method currently being used is "active packaging" whereby the package containing the food product has been modified in some manner to regulate the food's exposure to oxygen. One form of active packaging uses oxygen-scavenging sachets which contain a composition which scavenges the oxygen through oxidation reactions. One type of sachet contains iron-based compositions which oxidize to their ferric states. Another type of sachet contains unsaturated fatty acid salts on a particulate adsorbent. Yet another sachet contains metal/polyamide complex. However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate. Further, the sachets can present a problem to consumers if accidentally ingested.

Another means for regulating exposure of a packaged product to oxygen involves incorporating an oxygen scavenger into the packaging structure itself. A more uniform scavenging effect through the package is achieved by incorporating the scavenging material in the package instead of adding a separate scavenger structure (e.g., a sachet) to the package. This may be especially important where there is restricted airflow inside the package. In addition, incorporating the oxygen scavenger into the package structure provides a means of intercepting and scavenging oxygen as it permeates the walls of the package (herein referred to as an "active oxygen barrier"), thereby maintaining the lowest possible oxygen level in the package.

One attempt to prepare an oxygen-scavenging wall involves the incorporation of inorganic powders and/or salts. However, incorporation of these powders and/or salts causes reduction of the wall's optical transparency, discoloration after oxidation, and reduced mechanical properties such as tear strength. In addition, these compounds can lead to processing difficulties, especially when fabricating thin films. The oxidation products may migrate into food at levels which would not be regarded as safe or can impart unacceptable taste or smell to food.

An oxygen-scavenging composition comprising a blend of a first polymeric component comprising a polyolefin is known, the first polymeric component having been grafted with an unsaturated carboxylic anhydride or an unsaturated carboxylic acid, or combinations thereof, or with an epoxide; a second polymeric component having —OH, —SH, or —NHR$^2$ groups where R$^2$ is H, $C_1$–$C_3$ alkyl, substituted $C_1$–$C_3$ alkyl; and a catalytical amount of metal salt capable of catalyzing the reaction between oxygen and the second polymeric component, the polyolefin being present in an amount sufficient so that the blend is not phase-separated. A blend of polymers is utilized to obtain oxygen scavenging, and the second polymeric component is preferably a polyamide or a copolyamide such as the copolymer of m-xylylene-diamine and adipic acid (MXD6).

Some oxygen scavenging systems produce an oxygen-scavenging wall. This is done by incorporating a metal catalyst-polyamide oxygen scavenging system into the package wall. Through catalyzed oxidation of the polyamide, the package wall regulates the amount of oxygen which reaches the interior volume of the package (active oxygen barrier) and has been reported to have oxygen scavenging rate capabilities up to about 5 cubic centimeters (cc) oxygen per square meter per day at ambient conditions. However, this system suffers from significant disadvantages.

One particularly limiting disadvantage of polyamide/catalyst materials can be a low oxygen scavenging rate. Adding these materials to a high-barrier package containing air can produce a package which is not generally suitable for creating an internal oxygen level of less than 0.1% within seven days at storage temperatures, as is typically required for headspace oxygen scavenging applications.

There are also disadvantages to having the oxygen-scavenging groups in the backbone or network structure in this type of polyamide polymer. The basic polymer structure can be degraded and weakened upon reaction with oxygen. This can adversely affect physical properties such as tensile or impact strength of the polymer. The degradation of the backbone or network of the polymer can further increase the permeability of the polymer to those materials sought to be excluded, such as oxygen.

Moreover, polyamides previously used in oxygen scavenging materials, such as MXD6, are typically incompatible with thermoplastic polymers used in most flexible packaging walls, such as ethylene-vinyl acetate copolymers and low density polyethylene. Even further, when such polyamides are used by themselves to make a flexible package wall, they may result in inappropriately stiff structures. They also incur processing difficulties and higher costs when compared with the costs of thermoplastic polymers typically used to make flexible packaging. Even further, they are difficult to heat seal. Thus, all of these are factors to consider when selecting materials for packages, especially multi-layer flexible packages and when selecting systems for reducing oxygen exposure of packaged products.

Another approach to scavenging oxygen is an oxygen-scavenging composition comprising an ethylenically unsaturated hydrocarbon and a transition metal catalyst. Ethylenically unsaturated compounds such as squalene, dehydrated castor oil, and 1,2-polybutadiene are useful oxygen scavenging compositions, and ethylenically saturated compounds such as polyethylene and ethylene copolymers are used as diluents. Compositions utilizing squalene, castor oil, or other such unsaturated hydrocarbon typically have an oily texture as the compound migrates toward the surface of the material. Further, polymer chains which are ethylenically unsaturated in the backbone would be expected to degrade upon scavenging oxygen, weakening the polymer due to polymer backbone breakage, and generating a variety of off-odor/off-taste by-products.

Other oxidizable polymers recognized in the art include "highly active" oxidizable polymers such as poly(ethylene-methyl acrylate-benzyl acrylate), EMBZ, and poly(ethylene-methyl acrylate-tetrahydrofurfuryl acrylate), EMTF, as well as poly(ethylene-methyl acrylate-nopol acrylate), EMNP. Although effective as oxygen scavengers, these polymers have the drawback of giving off large amounts of volatile by-products and/or strong odors after oxygen scavenging.

Also known are oxygen-scavenging compositions which comprise a transition-metal salt and a compound having an ethylenic backbone and having allylic pendent or terminal moieties which contain a carbon atom that can form a free radical that is resonance-stabilized by an adjacent group. Such a polymer needs to contain a sufficient amount and type of transition metal salt to promote oxygen scavenging by the polymer when the polymer is exposed to an oxygen-containing fluid such as air. Although effective as oxygen scavengers, upon oxidation, we have found that allylic pendent groups on an ethylenic backbone tend to generate considerable amounts of organic fragments. We believe this is a result of oxidative cleavage. We believe these fragments can interfere with the use of allylic pendent groups as oxygen scavengers in food packaging.

The present invention solves many of the problems of the prior art, especially with an oxygen scavenging packaging material incorporating polymers comprising cyclic allylic (olefinic) pendent groups which produce little or no migration of oxidation by-products adversely affecting odor or taste, thus minimizing organoleptic problems in food packaging. This is because the cyclic allylic structures are less likely to fragment or cleave after oxidation than the conventional open chain allylic (olefinic) groups used in oxygen scavenging packaging material.

SUMMARY OF THE INVENTION

According to the present invention, a compound is provided comprising a polymeric backbone, cyclic olefinic pendent groups and linking groups linking the olefinic pendent groups to the polymeric backbone.

Also according to the present invention, an oxygen compound is provided comprising a polymeric backbone, cyclic olefinic pendent groups, linking groups linking the olefinic pendent groups to the polymeric backbone and a transition metal catalyst.

Also according to the present invention, an article of manufacture is provided which is suitable as a container, the container inhibiting oxidation of contents of the container by removing oxygen from the container and by inhibiting ingress of oxygen into the container from outside the container, the article comprising an oxygen scavenging compound which comprises a polymeric backbone, cyclic olefinic pendent groups, linking groups linking the olefinic pendent groups to the backbone, and a transition metal catalyst.

Also according to the present invention, a layer suitable for scavenging oxygen is provided which comprises (a) a polymer backbone; (b) cyclic olefinic pendent groups; (c) linking groups linking the backbone with the pendent groups; and (d) a transition metal catalyst.

Also according to the present invention, a process of making a polymer material is provided, the process being selected from the group consisting of esterification, transesterification, amidation, transamidation and direct polymerization, in which the oxygen scavenging packaging material comprises a polymer backbone, cyclic olefinic pendent groups, linking groups linking the backbone with the pendent groups.

In a preferred embodiment of the invention, the polymeric backbone of the above compound, article, layer and process is ethylenic and the linking groups are selected from the group consisting of:

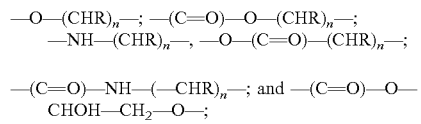

wherein R is hydrogen or an alkyl group selected from the group consisting of methyl, ethyl, propyl and butyl groups and where n is an integer in the range from 1 to 12.

In a more preferred embodiment of the invention, the cyclic olefinic pendent groups of the above compound, article, layer and process have the structure (I):

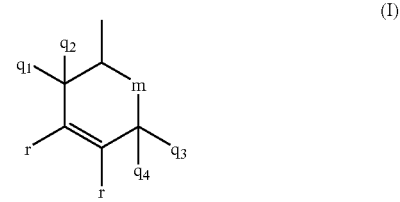

where $q_1$, $q_2$, $q_3$, $q_4$, and r are selected from the group consisting of —H, —CH$_3$, and —C$_2$H$_5$; and where m is —(CH$_2$)$_n$— with n being an integer in the range from 0 to 4; and wherein, when r is —H, at least one of $q_1$, $q_2$, $q_3$ and $q_4$ is —H.

In another preferred embodiment of the invention, the polymeric backbone of the above compound, article, layer and process comprises monomers selected from the group consisting of ethylene and styrene.

In yet another preferred embodiment of invention, the cyclic olefinic pendent groups of the above compound, article, layer and process are grafted onto the linking groups of the polymeric backbone by a esterification, transesterification, amidation or transamidation reaction.

In still another preferred embodiment of the invention, the esterification, transesterification, amidation or transamidation reaction of the above compound, article, layer and process is a solution reaction or a reactive extrusion.

In another preferred embodiment of the invention, the esterification, transesterification, amidation or transamidation reaction of the above compound, article, layer and process is catalyzed by a catalyst selected from the group consisting of strong non-oxidizing acids, tertiary amines, Group I alkoxides, Group IVB alkoxides, and Group IVA organometallics.

In yet another preferred embodiment of invention, the catalyst of the above compound, article, layer and process is selected from a group consisting of toluene sulfonic acid, sodium methoxide, tetrabutyl titanate, tetraisopropyl titanate, tetra-n-propyl-titanate, tetraethyl titanate, 2-hydroxypyridine and dibutyltin dilaurate.

In still another preferred embodiment of the invention, the polymeric backbone, linking groups and cyclic olefin pendent groups of the above compound, article, layer and process comprise repeating units, each unit having a structure (II) as follows:

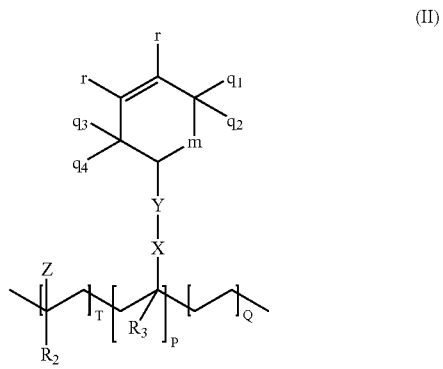

(II)

wherein P+T+Q is 100 mol % of the total composition; P is greater than 0 mol % of the total composition; Z is selected from the group consisting of an aryl group; —(C═O)OR$_1$; —O(C═O)R$_1$; and an alkyl aryl group:

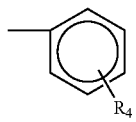

where R$_4$ is selected from the group consisting of —CH$_3$, —C$_2$H$_5$, and —H; R$_1$ is selected from the group consisting of —H, —CH$_3$, —C$_2$H$_5$, —C$_3$H$_7$ and —C$_4$H$_9$; R$_2$ and R$_3$ are selected from the group consisting of —H and —CH$_3$; X is selected from the group consisting of —O—, —NH—, —(C═O)O—, —(C═O)NH—, —(C═O)S—, —O(C═O)— and —(CHR)$_l$—; l is an integer in the range from 1 to 6; Y is —(CHR)$_n$—, where n is an integer in the range from 0 to 12, R being selected from the group consisting of —H, —CH$_3$ and —C$_2$H$_5$; where q$_1$, q$_2$, q$_3$, q$_4$, and r are selected from the group consisting of —H, —CH$_3$, and —C$_2$H$_5$; and where m is —(CH$_2$)$_n$— and where n is an integer in the range from 0 to 4; and wherein when r is —H, at least one of q$_1$, q$_2$, q$_3$ and q$_4$ is —H.

In another preferred embodiment of the invention, the cyclic olefinic pendent groups of the above compound, article, layer and process are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, 1,2,5-trimethyl cyclohexene-4-propylene radical, cyclopentene-4-methylene radical, 1-methyl cyclopentene-4-methylene radical, 3-methyl cyclopentene-4-methylene radical, 1,2-dimethyl cyclopentene-4-methylene radical, 3,5-dimethyl cyclopentene-4-methylene radical, 1,3-dimethyl cyclopentene-4-methylene radical, 2,3-dimethyl cyclopentene-4-methylene radical, 1,2,3-trimethyl cyclopentene-4-methylene radical, 1,2,3,5-tetramethyl cyclopentene-4-methylene radical, cyclopentene-4-ethylene radical, 1-methyl cyclopentene-4-ethylene radical, 3-methyl cyclopentene-4-ethylene radical, 1,2-dimethyl cyclopentene-4-ethylene radical, 3,5-dimethyl cyclopentene-4-ethylene radical, 1,3-dimethyl cyclopentene-4-ethylene radical, 2,3-dimethyl cyclopentene-4-ethylene radical, 1,2,3-trimethyl cyclopentene-4-ethylene radical, 1,2,3,5-tetramethyl cyclopentene-4-ethylene radical, cyclopentene-4-propylene radical, 1-methyl cyclopentene-4-propylene radical, 3-methyl cyclopentene-4-propylene radical, 1,2-dimethyl cyclopentene-4-propylene radical, 3,5-dimethyl cyclopentene-4-propylene radical, 1,3-dimethyl cyclopentene-4-propylene radical, 2,3-dimethyl cyclopentene-4-propylene radical, 1,2,3-trimethyl cyclopentene-4-propylene radical, and 1,2,3,5-tetramethyl cyclopentene-4-propylene radical.

In yet another preferred embodiment of the invention, the compound of the above compositions, article, layer and process is a ethylene/methyl acrylate/cyclohexenyl methyl acrylate terpolymer, a cyclohexenyl methyl acrylate/ethylene copolymer, a cyclohexenyl methyl methacrylate/styrene copolymer, a cyclohexenyl methyl acrylate homopolymer or a methyl acrylate/cyclohexenyl methyl acrylate copolymer.

In another preferred embodiment of the invention, the odor and taste characteristics of products packaged with material comprised of the above compound, article, layer and process are not adulterated as a result of oxidation of the composition.

In still another preferred embodiment of the invention, there is no significant fragmentation of the olefinic pendent groups and linking groups from the polymeric backbone as a result of oxidation of the above compound, article, layer and process.

In yet another preferred embodiment of the invention, the transition metal catalyst of the above oxygen scavenging compound, article of manufacture, layer and process is a metal salt.

In still another preferred embodiment of the invention, the metal in the metal salt of the above oxygen scavenging compound, article of manufacture, layer and process is cobalt.

In still another preferred embodiment of the invention, the metal salt of the above oxygen scavenging compound, article of manufacture, layer and process is selected from the group consisting of cobalt neodecanoate, cobalt 2-ethylhexanoate, cobalt oleate and cobalt stearate.

In yet another preferred embodiment of the invention, the composition of the above oxygen scavenging compound, article of manufacture, layer and process further comprises at least one triggering material to enhance initiation of oxygen scavenging.

In still another preferred embodiment of the invention, the triggering material of the above oxygen scavenging composition, article of manufacture, layer and process is a photo initiator.

In a preferred embodiment of the invention, the above article of manufacture is a package.

In another preferred embodiment of invention, the package article of the above article of manufacture comprises a flexible film having a thickness of at most 10 mil or a flexible sheet having a thickness of at least 10 mil.

In yet another preferred embodiment of the invention, the oxygen scavenging system of the package article of the above article of manufacture comprises at least one additional layer selected from among oxygen barrier layers, polymeric selective layers, and heat seal layers.

In still another preferred embodiment of the invention, the above article of manufacture is a package with a food product located within the package.

In yet another preferred embodiment of the invention, the above article of manufacture is a package for packaging a cosmetic, chemical, electronic device, pesticide or a pharmaceutical composition.

In still another preferred embodiment of the invention, a multi-layer film comprises the article of the above article of manufacture and the film has at least one additional functional layer.

In yet another preferred embodiment of the invention, the multi-layer film of the above article of manufacture has at least one additional layer selected from among oxygen barrier layers, polymeric selective barrier layers, structural layers and heat seal layers.

In still another preferred embodiment of the invention, the multi-layer film of the above article of manufacture has at least one additional layer which is an oxygen barrier layer.

In yet another preferred embodiment of the invention, the multi-layer film of the above article of manufacture further comprises at least one polymeric selective barrier layer.

In still another preferred embodiment of the invention, the multi-layer film of the above article of manufacture further comprises at least one heat seal layer.

In yet another preferred embodiment of the invention, the multi-layer film of the above article of manufacture further comprises at least one structural layer.

In still another preferred embodiment of the invention, the above article of manufacture is a rigid container, sealing gasket, patch, container closure device, bottle cap, bottle cap insert or molded or thermoformed shape.

In yet another preferred embodiment of the invention, the molded or thermoformed shape of the above article of manufacture is a bottle or tray.

In still another preferred embodiment of the invention, the above layer in addition comprises polymeric diluent.

In yet another preferred embodiment of the invention, the diluent of the above layer is a thermoplastic polymer.

In still another preferred embodiment of the invention, the above layer is adjacent to one or more additional layers.

In still another preferred embodiment of the invention, at least one of the additional layers adjacent to the above layer is an oxygen barrier.

In still another preferred embodiment of the invention, the oxygen barrier of the above layer comprises a member of the group consisting of poly(ethylene-vinyl alcohol), polyacrylonitrile, poly(vinyl chloride), polyamides, poly(vinylidene dichloride), poly(ethylene terephthalate), silica, metal foil and metalized polymeric films.

In still another preferred embodiment of the invention, the one or more of said additional layer or layers of the above layer is coextruded with the above layer.

In yet another preferred embodiment of the invention, the one or more of said additional layer or layers of the above layer is laminated onto the above layer.

In still another preferred embodiment of the invention, the one or more of said additional layer or layers of the above layer is coated onto the above layer.

In yet another preferred embodiment of the invention, the above layer is flexible.

In still another preferred embodiment of the invention, the above layer is transparent.

In yet another preferred embodiment of the invention, an article for packaging wherein the article comprises the above layer.

In yet another preferred embodiment of the invention, the above process of making the oxygen scavenging packaging material comprises the steps of:

(a) selecting polymers from the group consisting of styrene/maleic anhydride, ethylene/maleic anhydride, ethylene/acrylic acid, ethylene/methacrylic acid, acrylic acid, methacrylic acid, styrene/methacrylic acid, ethylene/methyl acrylate, ethylene/ethyl acrylate, ethylene/butyl acrylate, methyl methacrylate, methyl acrylate, and styrene/methyl methacrylate to form a mixture and combining the polymers with an esterifying/transesterifying compound selected from the group consisting of cyclohexene-4-methanol, 1-methyl cyclohexene-4-methanol, 2-methyl cyclohexene-4-methanol, 5-methyl cyclohexene-4-methanol, 1,2-dimethyl cyclohexene-4-methanol, 1,5-dimethyl cyclohexene-4-methanol, 2,5-dimethyl cyclohexene-4-methanol, 1,2,5-trimethyl cyclohexene-4-methanol, cyclohexene-4-ethanol, 1-methyl cyclohexene-4-ethanol, 2-methyl cyclohexene-4-ethanol, 5-methyl cyclohexene-4-ethanol, 1,2-dimethyl cyclohexene-4-ethanol, 1,5-dimethyl cyclohexene-4-ethanol, 2,5-dimethyl cyclohexene-4-ethanol, 1,2,5-trimethyl cyclohexene-4-ethanol, cyclohexene-4-propanol, 1-methyl cyclohexene-4-propanol, 2-methyl cyclohexene-4-propanol, 5-methyl cyclohexene-4-propanol, 1,2-dimethyl cyclohexene-4-propanol, 1,5-dimethyl cyclohexene-4-propanol, 2,5-dimethyl cyclohexene-4-propanol, 1,2,5-trimethyl cyclohexene-4-propanol, cyclopentene-4-methanol, 1-methyl cyclopentene-4-methanol, 3-methyl cyclopentene-4-methanol, 1,2-dimethyl cyclopentene-4-methanol, 3,5-dimethyl cyclopentene-4-methanol, 1,3-dimethyl cyclopentene-4-methanol, 2,3-dimethyl cyclopentene-4-methanol, 1,2,3-trimethyl cyclopentene-4-methanol, 1,2,3,5-tetramethyl cyclopentene-4-methanol, cyclopentene-4-ethanol, 1-methyl cyclopentene-4-ethanol, 3-methyl cyclopentene-4-ethanol, 1,2-dimethyl cyclopentene-4-ethanol, 3,5-dimethyl cyclopentene-4-ethanol, 1,3-dimethyl cyclopentene-4-ethanol, 2,3-dimethyl cyclopentene-4-ethanol, 1,2,3-trimethyl cyclopentene-4-ethanol, 1,2,3,5-tetramethyl cyclopentene-4-ethanol, cyclopentene-4-propanol, 1-methyl cyclopentene-4-propanol, 3-methyl cyclopentene-4-propanol, 1,2-dimethyl cyclopentene-4-propanol, 3,5-dimethyl cyclopentene-4-propanol, 1,3-dimethyl cyclopentene-4-propanol, 2,3-dimethyl cyclopentene-4-propanol, 1,2,3-trimethyl cyclopentene-4-propanol, and 1,2,3,5-tetramethyl cyclopentene-4-propanol;

(b) heating the polymers and esterifying/transesterifying compounds selected in (a) to form a polymer melt;

(c) processing the melt in an extruder under esterification/ transesterification conditions with esterification/transesterification catalysts and antioxidants protecting the melt from oxidation during extrusion, so that the polymer melt undergoes esterification of polymeric anhydrides with cyclic olefin pendent groups, esterification of polymeric acids with cyclic olefin pendent groups or exchange of alkyl groups of polymeric esters with cyclic olefin pendent groups; and (d) removing volatile organic products and by-products from the melt.

In still another preferred embodiment of the invention, the above process of making the oxygen scavenging packaging material comprises the steps of:

(a) selecting polymers from the group consisting of styrene/maleic anhydride, ethylene/maleic anhydride, ethylene/acrylic acid, ethylene/methacrylic acid, acrylic acid, methacrylic acid, styrene/methacrylic acid, ethylene/methyl acrylate, ethylene/ethyl acrylate, ethylene/ butyl acrylate, methyl methacrylate, methyl acrylate, and styrene/methyl methacrylate to form a mixture and combining the polymers with an amidizing/transamidizing compound selected from the group consisting of cyclohexene-4-methyl amine, 1-methyl cyclohexene-4-methyl amine, 2-methyl cyclohexene-4-methyl amine, 5-methyl cyclohexene-4-methyl amine, 1,2-dimethyl cyclohexene-4-methyl amine, 1,5-dimethyl cyclohexene-4-methyl amine, 2,5-dimethyl cyclohexene-4-methyl amine, 1,2,5-trimethyl cyclohexene-4-methyl amine, cyclohexene-4-ethyl amine, 1-methyl cyclohexene-4-ethyl amine, 2-methyl cyclohexene-4-ethyl amine, 5-methyl cyclohexene-4-ethyl amine, 1,2-dimethyl cyclohexene-4-ethyl amine, 1,5-dimethyl cyclohexene-4-ethyl amine, 2,5-dimethyl cyclohexene-4-ethyl amine, 1,2,5-trimethyl cyclohexene-4-ethyl amine, cyclohexene-4-propyl amine, 1-methyl cyclohexene-4-propyl amine, 2-methyl cyclohexene-4-propyl amine, 5-methyl cyclohexene-4-propyl amine, 1,2-dimethyl cyclohexene-4-propyl amine, 1,5-dimethyl cyclohexene-4-propyl amine, 2,5-dimethyl cyclohexene-4-propyl amine, 1,2,5-trimethyl cyclohexene-4-propyl amine, cyclopentene-4-methyl amine, 1-methyl cyclopentene-4-methyl amine, 3-methyl cyclopentene-4-methyl amine, 1,2-dimethyl cyclopentene-4-methyl amine, 3,5-dimethyl cyclopentene-4-methyl amine, 1,3-dimethyl cyclopentene-4-methyl amine, 2,3-dimethyl cyclopentene-4-methyl amine, 1,2,3-trimethyl cyclopentene-4-methyl amine, 1,2,3,5-tetramethyl cyclopentene-4-methyl amine, cyclopentene-4-ethyl amine, 1-methyl cyclopentene-4-ethyl amine, 3-methyl cyclopentene-4-ethyl amine, 1,2-dimethyl cyclopentene-4-ethyl amine, 3,5-dimethyl cyclopentene-4-ethyl amine, 1,3-dimethyl cyclopentene-4-ethyl amine, 2,3-dimethyl cyclopentene-4-ethyl amine, 1,2,3-trimethyl cyclopentene-4-ethyl amine, 1,2,3,5-tetramethyl cyclopentene-4-ethyl amine, cyclopentene-4-propyl amine, 1-methyl cyclopentene-4-propyl amine, 3-methyl cyclopentene-4-propyl amine, 1,2-dimethyl cyclopentene-4-propyl amine, 3,5-dimethyl cyclopentene-4-propyl amine, 1,3-dimethyl cyclopentene-4-propyl amine, 2,3-dimethyl cyclopentene-4-propyl amine, 1,2,3-trimethyl cyclopentene-4-propyl amine, and 1,2,3,5-tetramethyl cyclopentene-4-propyl amine;

(b) heating the polymers and amidizing/transamidizing compounds selected in (a) to form a polymer melt;

(c) processing the melt in an extruder under amidation/ transamidation conditions with amidation/transamidation catalysts and antioxidants protecting the melt from oxidation during extrusion, so that the polymer melt undergoes amidation of polymeric anhydrides with cyclic olefin pendent groups, amidation of polymeric acids with cyclic olefin pendent groups or exchange of alkyl groups of polymeric esters with cyclic olefin pendent groups; and (d) removing volatile organic products and by-products from the melt.

In yet another preferred embodiment of the invention, the above process of making of the oxygen scavenging packaging material comprises the steps of:

(a) adding to an autoclave, ethylene and a vinyl monomer comprising a pendent cyclohexene;

(b) stirring the ethylene and the vinyl monomer in the autoclave to achieve a mixture;

(c) adding a polymerization initiator before, during or after the stirring step;

(d) polymerizing the mixture to achieve a polymer; and (e) isolating and purifying the polymer.

In still another embodiment of the invention, in the above process, in step (a), an alpha-olefin is added to the autoclave along with the ethylene and the vinyl monomer and, in step (b), the alpha-olefin is stirred with the ethylene and the vinyl monomer to achieve the mixture.

DETAILED DESCRIPTION OF THE INVENTION

This invention relates an oxygen scavenging polymer compound comprising cyclic olefinic pendent groups which can be used in oxygen scavenging packaging material which have either no or low volatile oxidation by-products. Minimizing volatile by-products reduces the problem of organoleptics in oxygen scavenging food packaging.

Figure 1:
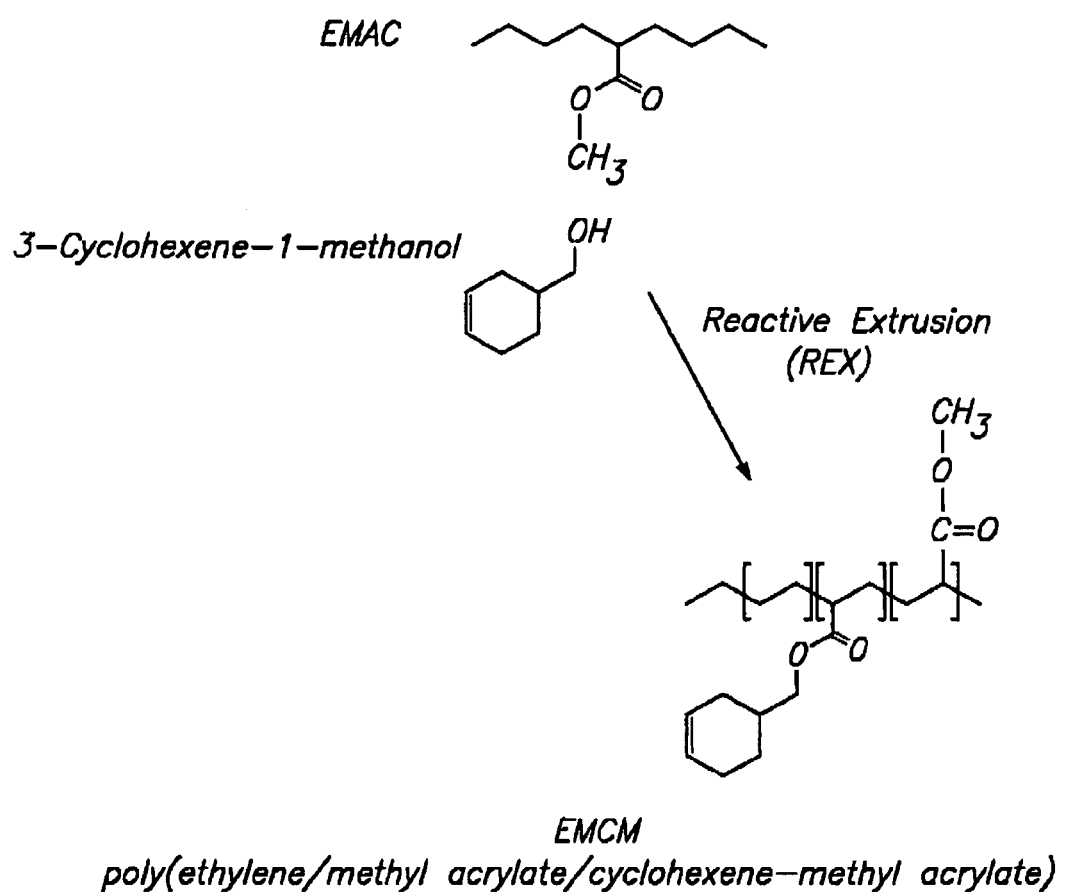
FIG. 1 is a schematic showing the overall process leading to the transesterification of ethylene methyl acrylate copolymers (EMAC) to give modified EMAC having cyclic pendent olefins.

The polymer compound with cyclic olefinic pendent groups can be made by grafting methyl cyclohex-1-ene-4-methanol, cyclohex-1-ene-4-methanol (1,2,5,6-tetrahydrobenzyl alcohol) and cyclohex-1-ene-4-propanol onto EMAC resins by transesterification of the corresponding alcohols or transamidation of the corresponding amines with the methyl esters on EMAC to give modified EMAC having pendent cyclic olefins (see FIG. 1). The compound can also be made by direct polymerization.

The esterification, transesterification, amidation or transamidation reaction can be a solution reaction or by reactive extrusion. The catalysts can be any one of strong non-oxidizing acids, tertiary amines, Group I alkoxides, Group IVB alkoxides and Group IVA metal organics. The level of olefin in the final products can be controlled by the level of transesterification and the methyl ester content of the start EMAC. The molecular weight of the polymers largely depends on the molecular weight of the EMAC feeds.

In a preferred embodiment, these products are combined with a transition-metal salt to catalyze the oxygen scavenging properties of the materials. A transition-metal salt, as the term is used here, comprises an element chosen from the first, second and third transition series of the periodic table of the elements, particularly one that is capable of promoting oxidation reactions. This transition-metal salt is in a form which facilitates or imparts scavenging of oxygen by the composition of this invention. A plausible mechanism, not intended to place limitations on this invention, is that the transition element can readily inter-convert between at least two oxidation states and facilitates formation of free radicals. Suitable transition-metal elements include, but are not limited to, manganese II or III, iron II or III, cobalt II or III, nickel II or III, copper I or II, rhodium II, III or IV, and ruthenium. The oxidation state of the transition-metal element when introduced into the composition is not necessarily that of the active form. It is only necessary to have the transition-metal element in its active form at or shortly before the time that the composition is required to scavenge oxygen. The transition-metal element is preferably iron, nickel or copper, more preferably manganese and most preferably cobalt.

Suitable counter-ions for the transition metal element are organic or inorganic anions. These include, but are not limited to, chloride, acetate, stearate, oleate, palmitate, 2-ethylhexanoate, citrate, glycolate, benzoate, neodecanoate or naphthenate. Organic anions are preferred. Particularly preferable salts include cobalt 2-ethylhexanoate, cobalt benzoate, cobalt stearate, cobalt oleate and cobalt neodecanoate. The transition-metal element may also be introduced as an ionomer, in which case a polymeric counter-ion is employed.

The composition of the present invention when used in forming a oxygen scavenging packaging article can be composed solely of the above described polymer and transition metal catalyst. However, components, such as photoinitiators, can be added to further facilitate and control the initiation of oxygen scavenging properties. For instance, it is often preferable to add a photoinitiator, or a blend of different photoinitiators, to the oxygen scavenger compositions, especially when antioxidants are included to prevent premature oxidation of that composition during processing.

Suitable photoinitiators are well known in the art. Such photoinitiators are discussed in U.S. Pat. No. 5,211,875. It is also discussed in U.S. patent application Ser. No. 08/857,325, in which some of the present inventors were contributing inventors and which is incorporated herein by reference. Specific examples include, but are not limited to, benzophenone, o-methoxy-benzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, substituted and unsubstituted anthraquinones, α-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxy-acetophenone, α,α-dibutoxyacetophenone, etc. Singlet oxygen generating photosensitizers such as Rose Bengal, methylene blue, and tetraphenyl porphine may also be employed as photoinitiators. Polymeric initiators include polyethylene carbon monoxide and oligo[2-hydroxy-2-methyl-1-[4-(1-methylvinyl)phenyl]propanone]. Use of a photoinitiator is preferable because it generally provides faster and more efficient initiation.

When a photoinitiator is used, its primary function is to enhance and facilitate the initiation of oxygen scavenging upon exposure to radiation. The amount of photoinitiator can vary. In many instances, the amount will depend on the amount and type of oxygen scavenging polymer in the present invention, the wavelength and intensity of radiation used, the nature and amount of antioxidants used, as well as the type of photoinitiator used. The amount of photoinitiator also depends on how the scavenging composition is used. For instance, if the photoinitiator-coating composition is placed underneath a layer which is somewhat opaque to the radiation used, more initiator may be needed. For most purposes, however, the amount of photoinitiator, when used, will be in the range of 0.01 to 10% by weight of the total composition. The initiating of oxygen scavenging can be accomplished by exposing the packaging article to actinic or electron beam radiation, as described below.

Antioxidants may be incorporated into the scavenging compositions of this invention to control degradation of the components during compounding and shaping. An antioxidant, as defined herein, is any material which inhibits oxidative degradation or cross-linking of polymers. Typically, such antioxidants are added to facilitate the processing of polymeric materials and/or prolong their useful shelf-life.

Antioxidants such as Vitamin E, Irganox® 1010, Irganox® 1076, 2,6-di(t-butyl)-4-methyl-phenol(BHT), 2,6-di(t-butyl)-4-ethyl-phenol (BHEB), 2,2'-methylene-bis(6-t-butyl-p-cresol), triphenylphosphite, tris-(nonylphenyl) phosphite and dilaurylthiodipropionate would be suitable for use with this invention.

When an antioxidant is included as part of the present composition, it should be used in amounts which will prevent oxidation of the scavenger composition's components as well as other materials present in a resultant blend during formation and processing but the amount should be less than that which would interfere with the scavenging activity of the resultant layer, film or article. The particular amount needed will depend on the particular components of the composition, the particular antioxidant used, the degree and amount of thermal processing used to form the shaped article, and the dosage and wavelength of radiation applied to initiate oxygen scavenging and can be determined by conventional means. Typically, they are present in about 0.01 to 1% by weight.

Other additives which may also be included in oxygen scavenger layers include, but are not necessarily limited to, fillers, pigments, dyestuffs, stabilizers, processing aids, plasticizers, fire retardants, anti-fog agents, etc.

The amounts of the components which are used in the oxygen scavenging compositions, or layers have an effect on the use, effectiveness and results of this method. Thus, the amounts of polymer, transition metal catalyst and any photoinitiator, antioxidant, polymeric diluents and additives, can vary depending on the article and its end use.

For instance, one of the primary functions of the polymer described above is to react irreversibly with oxygen during the scavenging process, while the primary function of the transition metal catalyst is to facilitate this process. Thus, to a large extent, the amount of polymer present will affect the oxygen scavenging capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the onset of oxygen scavenging (induction period).

It has been found that the subject polymers, when used as part of the present composition, provide oxygen scavenger properties at desirable rate and capacity while causing the composition to have enhanced processability and compatibility properties over conventional ethylenically unsaturated polymers. Thus, the present composition can be used to provide, by itself or as a blend with diluent polymers, such as polyolefins and the like, a packaging material or film having enhanced processability properties. Further, the present composition consumes and depletes the oxygen within a package cavity without substantially detracting from the color, taste and/or odor of the product contained within the package cavity.

The amount of the above-described polymer contained as part of the present composition may range from about 1 to 100% by weight of the composition or layer composed of said composition in which both polymer and transition metal catalyst are present (hereinafter referred to as the "scavenging composition", e.g., in a coextruded film or container, the scavenging composition would comprise the particular layer(s) in which both the copolymer and transition metal catalyst components are present together). Typically, the amount of transition metal catalyst may range from 0.001 to 1% (10 to 10,000 ppm) of the scavenging composition, based on the metal content only (excluding ligands, counterions, etc.). In the event the amount of transition metal catalyst is less than 1%, it follows that the polymer and any additives will comprise substantially all of the remainder of the composition. The polymer of the present invention may further be combined with other polymeric oxygen scavenger agents.

Any further additives employed normally will not comprise more than 10% of the scavenging composition, with preferable amounts being less than 5% by weight of the scavenging composition.

Optionally, the compositions and process of this invention can include exposure of the polymer containing the oxygen scavenging-promoting transition metal to actinic radiation to reduce the induction period, if any, before oxygen scavenging commences. A method is known for initiating oxygen scavenging by exposing a film comprising an oxidizable organic compound and a transition metal catalyst to actinic radiation. A composition of the present invention which has a long induction period in the absence of actinic radiation but a short or non-existent induction period after exposure to actinic radiation is particularly preferred. They maintain a high capability for scavenging oxygen upon activation with actinic radiation. Thus, oxygen scavenging can be activated when desired.

The radiation used in this method should be actinic, e.g., ultraviolet or visible light having a wavelength of about 200 to 750 nanometers (nm), and preferably having a wavelength of about 200 to 600 nm, and most preferably from about 200 to 400 nm. When employing this method, it is preferable to expose the oxygen scavenger to at least 0.01 Joule per gram of scavenging composition. A typical amount of exposure is in the range of 10 to 2000 Joules per gram. The radiation can also be an electron beam radiation at a dosage of about 2 to 200 kiloGray, preferably about 10 to 100 kiloGray. Other sources of radiation include ionizing radiation such as gamma, X-rays and corona discharge. The duration of exposure depends on several factors including, but not limited to, the amount and type of photoinitiator present, thickness of the layers to be exposed, thickness and opacity of intervening layers amount of any antioxidant present, and the wavelength and intensity of the radiation source. The radiation provided by heating of polyolefin and the like polymers (e.g., 100–250° C.) during processing does not cause triggering.

Oxygen-scavenging compositions of the present invention are useful in many ways. The compositions can be dispersed as small particles for absorbing oxygen or can be coated onto materials such as metallic foil, polymer film, metalized film, paper or cardboard to provide, in some embodiments, scavenging properties and/or adhesive properties. The compositions are also useful in making articles such as single or multi-layer rigid thick-walled plastic containers or bottles (typically, between 5 and 100 mils in thickness) or in making single or multi-layer flexible films, especially thin films (less than 5 mils, or even as thin as about 0.25 mil). Some of the compositions of the present invention are easily formed into films using well-known means. These films can be used alone or in combination with other films or materials.

The compositions of the present invention may be further combined with one or more polymers, such as thermoplastic polymers which are typically used to form film layers in plastic packaging articles. In the manufacture of certain packaging articles, well-known thermosets can also be used as a polymeric diluent.

Selecting combinations of a diluent and the composition of the present invention depends on the properties desired. Polymers which can be used as the diluent include, but are not limited to, polyethylene, low or very low density polyethylene, polypropylene, polyvinyl chloride, and ethylene copolymers such as ethylene-vinyl acetate, ethylene-alkyl acrylates or methacrylates, ethylene-acrylic acid or methacrylic acid, and ethylene-arylic or metharylic acid ionomers. In rigid packaging applications, polystyrene is often used.

Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the composition of the present invention. In some instances, the clarity, cleanliness, effectiveness as an oxygen-scavenger, barrier properties, mechanical properties and/or texture of the article can be adversely affected by a blend containing a polymer which is incompatible with the composition of the present invention.

A blend of a composition of the present invention with a compatible polymer can be made by dry blending or by melt-blending the polymers together at a temperature in the approximate range of 50° C. to 250° C. Alternative methods of blending include the use of a solvent followed by evaporation. When making film layers or articles from oxygen-scavenging compositions, extrusion or coextrusion, solvent casting, injection molding, stretch blow molding, orientation, thermoforming, extrusion coating, coating and curing, lamination or combinations thereof would typically follow the blending.

Layers comprising the composition of the present invention may be in several forms. They may be in the form of stock films, including "oriented" or "heat shrinkable" films, which may ultimately be processed as bags, etc., or in the form of stretch-wrap films. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

In multi-layered articles, the scavenging layer comprising the composition of the present invention may be included with layers such as, but not necessarily limited to, "oxygen barriers", i.e., layers of material having an oxygen transmission rate equal to or less than 100 cubic centimeters-mil per square meter (cc-mil/m$^2$) per day per atmosphere pressure at room temperature, i.e., about 25° C. Typical oxygen barriers comprise poly(ethylene vinyl alcohol), polyacrylonitrile, polyvinyl chloride, poly(vinylidene dichloride), polyethylene terephthalate, silica and polyamides. Metal foil layers can also be employed.

Other additional layers may include one or more layers which are permeable to oxygen. In one preferred packaging construction, especially for flexible packaging for food, the layers include, in order starting from the outside of the package to the innermost layer of the package, (i) an oxygen barrier layer, (ii) a scavenging layer, i.e., the scavenging composition as defined earlier, and, optionally, (iii) an oxygen permeable layer. Control of the oxygen barrier property of (i) allows a means to regulate the scavenging life of the package by limiting the rate of oxygen entry to the scavenging composition (ii), and thus limiting the rate of consumption of scavenging capacity. Control of the oxygen permeability of layer (iii) allows a means to set an upper limit on the rate of oxygen scavenging for the overall structure independent of the composition of the scavenging composition (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-sealability, clarity and/or resistance to blocking of the multi-layer film.

Further, additional layers such as adhesive layers may also be used. Compositions typically used for adhesive layers include anhydride functional polyolefins and other well-known adhesive layers.

To determine the oxygen scavenging capabilities of a composition, the rate of oxygen scavenging can be calculated by measuring the time that elapsed before the article depletes a certain amount of oxygen from a sealed container. For instance, a film comprising the scavenging component can be placed in an air-tight, sealed container of a certain oxygen containing atmosphere, e.g., air which typically contains 20.9% oxygen by volume. Then, over a period of time, samples of the atmosphere inside the container are removed to determine the percentage of oxygen remaining. The scavenging rates of the composition and layers of the present invention will change with changing temperature and atmospheric conditions.

When an active oxygen barrier is prepared, the scavenging rate can be as low as 0.1 cc oxygen per gram of composition of the present invention per day in air at 25° C. and a 1 atmosphere pressure. However, preferable compositions of this invention have rates equal to or greater than 1 cc oxygen per gram per day, thus making them suitable for scavenging oxygen from within a package, as well as suitable for active oxygen barrier applications. Many compositions are even capable of more preferable rates equal to or greater than 5.0 cc $O_2$ per gram per day.

Generally, film layers suitable for use as an active oxygen barrier can have an oxygen transmission rate as high as 10 cc oxygen per square meter per mil per day when measured in air at 25° C. and 1 atmosphere pressure. Preferably, a layer of this invention has an oxygen transmission rate less than about 1 cc oxygen per square meter per mil per day, and more preferably has an oxygen transmission rate less than about 0.2 cc oxygen per square meter per rail per day under the same conditions, thus making it suitable for active oxygen barrier applications as well as for scavenging oxygen from within a package.

In an active oxygen barrier application, it is preferable that the combination of oxygen barriers and any oxygen scavenging activity create an overall oxygen transmission rate of less than about 1.0 cubic centimeter-mil per square meter per day per atmosphere pressure at 25° C. Another definition of acceptable oxygen scavenging is derived from testing actual packages. In actual use, the scavenging rate requirement will largely depend on the internal atmosphere of the package, the contents of the package and the temperature at which it is stored.

In a packaging article made according to this invention, the scavenging rate will depend primarily on the amount and nature of the composition of the present invention in the article, and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of the scavenging moieties present in the article, as discussed above.

In actual use, the oxygen scavenging capacity requirement of the article will largely depend on three parameters of each application:

(1) the quantity of oxygen initially present in the package;
(2) the rate of oxygen entry into the package in the absence of the scavenging property; and
(3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 500 cc oxygen per square meter per mil thickness.

Other factors may also affect oxygen scavenging and should be considered when selecting compositions. These factors include but are not limited to temperature, relative humidity, and the atmospheric environment in the package.

Non-limiting examples are given in Examples 1 and 2 below of experimental conditions that were used for preparation of the polymers. Non-limiting examples of the resin preparation followed by steam stripping as well as compounding the polymers with oxidation catalyst, such as cobalt oleate and a photoinitiator, such as Methanone, [5'-(5'-(4-benzoylphenyl)[1,1':3', 1"-terphenyl]-4,4"-diyl]bis[phenyl-(hereinafter referred to as $BBP^3$), and extruded into a 3-layer film having a PE/oxygen scavenging polymer/PE structure are provided in Examples 3 through 6 below.

Headspace studies of three layer films made by compounding catalyst package with both fresh and aged (20 months stored in air at ambient temperature) resins after UV triggering give a very fast rate of oxygen scavenging and the resulting packages are relatively non-odorous. Non-limiting examples of such studies are given in Examples 7 and 8. Furthermore, the above polymer can be further diluted by a lower cost oxygen permeable resin, such as EBAC or PE or EVA, down to 50 and even 25% of the original concentration and still maintain a high oxygen scavenging rate, as the non-limiting examples in Examples 9 and 10 show.

EXAMPLES

Example 1

Polymer Preparation (C1641-6)

550 ml of decalin® was placed in a flask. To this was added 350 g of Chevron EMAC SP-2260 which has 24 weight % of methyl acrylate (0.9767 moles of methyl acrylate) and 0.48 g of Irganox®1076 (0.1 mole). The temperature of the mixture was gradually raised while stirring. When the temperature reached approximately 120° C., 127.1 g (0.9767 moles) of 3-methyl-cyclohex-1-ene-4-methanol (97%) was added. When the temperature reached approximately 140° C., 4.8 g of the catalyst $Ti(OC_2H_5)_4$ was added a portion at a time. The temperature was maintained at 170° C. while stirring. The course of the reaction was observed by subjecting samples of the mixture to NMR at hourly intervals. The percent conversion is given in Table 1 below. After 5 hours of reaction, the mixture was cooled and 400 ml of $CHCl_3$ was added and the mixture was then precipitated by adding it to 4 liters of $CH_3OH$ in a Waring blender. The precipitate is filtered and washed with $CH_3OH$ and dried in a vacuum oven at 50° C. The dried mixture yielded 407.5 g of ethylene/methyl acrylate/methyl cyclohexene methyl acrylate (EMCM).

TABLE 1

| Time (hours) | Percent Conversion |
| --- | --- |
| 1 hour | 50% |
| 2 hours | 62.3% |
| 3 hours | 65.5% |
| 5 hours | 87.1% |

390 grams of a combination of the above prepared polymer and the same polymer prepared under the same conditions in a different batch, which together have a conversion percentage of 68.8%, was solvent coated with 3.25 g cobalt-neodecanoate in 70 ml normal hexane. The mixture was tumble dried for 1.5 hours and residual solvent removed in a vacuum.

Example 2

Polymer Preparation 600 ml of decalin was placed in a flask. To this was added 334 grams of Chevron SP-2260 (0.9330 moles of methyl acrylate) and 0.44 g of Irganox® 1010 (0.1% mole). The temperature of the mixture was gradually raised while stirring. When the temperature reached approximately 120° C., 104.6 g (0.93 moles) of cyclohex-1-ene-4-methanol was added. When the temperature reached approximately 140° C., 4.4 g of the catalyst $Ti(OC_2H_5)_4$ was added a portion at a time. The temperature was maintained at 160° C. while stirring. The course of the reaction was observed by subjecting samples of the mixture to NMR at hourly intervals. The percent conversion is given in Table 2 below. After 3 hours of reaction, the mixture was cooled and 400 ml of $CHCl_3$ was added and the mixture was then precipitated by adding it to 4 liters of $CH_3OH$ in a Waring blender. The precipitate was filtered and washed with $CH_3OH$ and dried in a vacuum oven at 50° C. The dried mixture yielded 380.5 g of polymer.

TABLE 2

| Time (hours) | Percent Conversion |
| --- | --- |
| 1 hour | 43.8% |
| 2 hours | 56.7% |
| 3 hours | 55.7% |

185 grams of the above-prepared polymer was combined with 45 ml normal hexane and 1.54 g cobalt-neodecanoate resulting in 1000 ppm of cobalt ion and 0.0185 g Irganox® 1010 resulting in 100 ppm Irganox®. The mixture was heated and blended and then dried in a vacuum-oven. The resulting compound was extruded into a film.

Additionally, 185 grams of the above-prepared polymer was combined with 45 ml normal hexane and 1.54 g cobalt-neodecanoate (resulting in 1000 ppm of cobalt ion) and 0.046 g Irganox® 1010 (resulting in 250 ppm Irganox®). The mixture is heated and blended and then dried in a vacuum-oven. The resulting compound is extruded into a film.

Example 3

EMCM Made in ZSK-30 Extruder

Ethylene-methyl acrylate copolymer (EMAC) was fed into a Werner & Pfleiderer ZSK-30 twin screw extruder at 6 kg/hr, and the reactants and catalysts were added to the extruder in a subsequent reaction zone. The catalyst $Ti(OC_3H_7)_4$ was added with the reactants at 3 mol % or at a rate of 148 cc/hr. Irganox®/Toluene solution was added at 4.5 g/900 cc using a Milton Roy 29/290 mini-pump. To obtain 100 ppm of Irganox®, it must be added at 2.2 cc/min. To obtain 50 ppm of Irganox®, it must be added at 1.1 cc/min. Cyclohexane methyl alcohol with 1,000 ppm of an antioxidant of BHT was added via a Milton Roy dual head at 1958 cc/hr. Steam is injected into the system at 800 cc $H_2O/Hr$ at the end of the reaction zone.

51 lbs of EMCM product (100 ppm Irganox® 1010, 59.3% methyl alcohol (MA), 2.98 g/10 min. Melt Flow) was produced over a period of approximately 2 hours.

Example 4

EMCM Made in ZSK-30

45 lbs of EMCM product (100 ppm Irganox® 1010, 2.38 g/10 min Melt Index) was extruded over a period of approximately 3 hours. A dual steam stripping setup was used in which pressurized injectors at zones 4 and 11 of the extruder pumped steam at 1076 cc/hr and 728 cc/hr, respectively. Both injectors were Pulse 680 pumps with a pressure of at least 800 psi, except at the first measured time interval when injector (No. 4) was measured at 500–550 psi and injector (No. 11) was measured at 500 psi.

Example 5

Co-polymerization of Styrene and 3-Cyclohexene-1-Methanol Methacrylate

In a 1-liter round bottom flask, 65 grams styrene (0.625 mole), 113 grams of 3-cyclohexene-1-methanol methacrylate (0.625 mole), 1.25 grams of Benzoyl peroxide and 450 grams of toluene were mixed and degassed by freeze-thaw cycles. The degassed solution was polymerized at 70–75° C. for 48 hours and discharged into 2 liters of methanol in a Waring Blender. The product isolated was dried in a vacuum oven at 50° C. for 2 hours to give 155 grams of co-polymer. NMR analysis indicates it contains 48 mole % of styrene and 52 mole % of 3-cyclohexene-1-methanol methacrylate. Tg by DSC is 66° C.

Example 6

Oxygen Scavenging Test of Styrene/CHMA Copolymer 90 weight % of the above-mentioned co-polymer and 10 weight % of a EVA based Master batch containing 1 weight % of co-oleate and 1 weight % of a photoinitiator (BBP[3]) were processed into a 8 mil thick monolayer film. A 100 cm² film was irradiated at both sides to receive 800 mJoules/cm² of 254 nm UV on each side and sealed into a foil bag containing 300 cc of 1% oxygen. The oxygen uptake was monitored up to 11 days at 4° C. and at room temperature. The results are shown in Tables 3 (4° C.) and 4 (room temperature).

TABLE 3

| Time (days) | $O_2$ Meas. Vol % | $O_2$ Meas. Vol, ml | Vol-$O_2$ Used ml | $O_2$ Uptake ml/g | $O_2$ Uptake Avg Rate cc/m²/day | Instant Rate cc/ m²/day | $O_2$ Capacity cc/m²/mil |
|---|---|---|---|---|---|---|---|
| 0.0 | 1.05 | 3.15 | 0.00 | 0.00 | 0.00 | 0.00 | 0.00 |
| 1.1 | 0.94 | 2.77 | 0.32 | 0.18 | 14.79 | 14.79 | 1.62 |
| 3.9 | 0.49 | 1.42 | 1.63 | 0.92 | 20.73 | 23.03 | 8.15 |
| 4.8 | 0.39 | 1.11 | 1.91 | 1.08 | 19.81 | 15.78 | 9.57 |
| 7.0 | 0.30 | 0.84 | 2.17 | 1.22 | 15.40 | 5.72 | 10.83 |
| 11.0 | 0.09 | 0.25 | 2.74 | 1.54 | 12.43 | 7.22 | 13.72 |

TABLE 4

| Time (days) | $O_2$ Meas. Vol % | $O_2$ Meas. Vol, ml | Vol-$O_2$ Used ml | $O_2$ Uptake ml/g | $O_2$ Uptake Avg Rate cc/m²/day | Instant Rate cc/ m²/day | $O_2$ Capacity cc/m²/mil |
|---|---|---|---|---|---|---|---|
| 0.0 | 1.04 | 3.12 | 0.00 | 0.00 | 0.00 | 0.00 | 0.00 |
| 1.1 | 0.48 | 1.42 | 1.65 | 1.03 | 75.28 | 75.28 | 8.26 |
| 3.9 | 0.09 | 0.26 | 2.78 | 1.73 | 35.40 | 19.96 | 13.92 |
| 4.8 | 0.04 | 0.11 | 2.93 | 1.82 | 30.26 | 7.89 | 14.63 |
| 7.0 | 0.01 | 0.03 | 3.01 | 1.87 | 21.39 | 1.91 | 15.05 |
| 11.0 | 0.01 | 0.03 | 3.01 | 1.87 | 13.64 | 0.00 | 15.05 |

Example 7

Polymerization of 3-cyclohexene-1-methanol acrylate 75 grams (0.45 mole) of 3-cyclohexene-1-methanol acrylate (CHAA), 200 ml of toluene and 0.5 grams of Benzoyl peroxide were charged into a 500 ml round-bottomed flask and degassed by freeze-thaw cycles. The degassed solution was polymerized at 70–75° C. for 48 hours. The viscous polymer solution was worked up by precipitating in methanol solution in a Waring blender. After vacuum drying at room temperature for 3 days, the product is a rubbery clear polymer which weighs 53 grams.

Example 8

Figure 2:
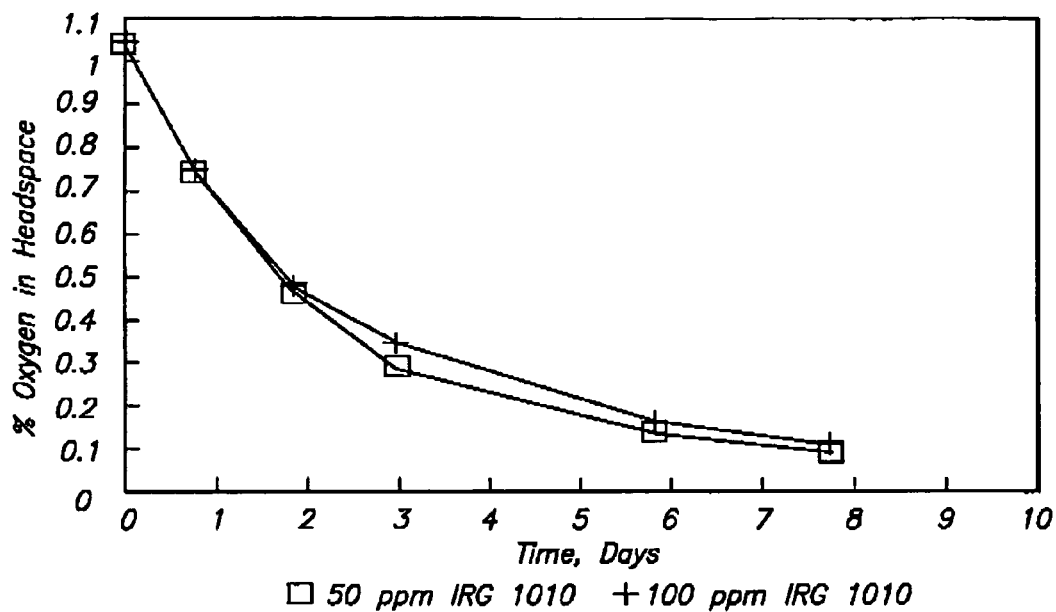
FIG. 2 is a graph comparatively plotting percent oxygen in headspace at 4° C. (initially at 1% oxygen) against time in days for two 3-layer film extrusions based on Dowlex® 3010/EMCM/Dowlex® 3010 films (EMCM being an acronym for ethylene/methyl acrylate/cyclohexenyl methyl acrylate terpolymer also referred to as poly(ethylene/methyl acrylate/cyclohexene-methyl acrylate)), both including the EMCM inner layer and one of them having 50 ppm of a non-volatile antioxidant Irganox® 1010 in the EMCM layer and one of them having 100 ppm Irganox® 1010 in the EMCM layer.

Headspace Analysis of $O_2$ Scavenging in Dowlex® 3010/EMCM/Dowlex® 3010 Films Oxygen scavenging analysis was performed using a Mocon HS750 with a headspace volume of 300 cc. The sample tested was a 0.48 g three-layer film with Dowlex® 3010 film for the two outside layers and steam stripped EMCM (59% converted) for the middle layer (50 ppm Irganox® 1010). The thickness of the layers was 0.5/1/0.5+/−0.1 Mil. The oxygen scavenging portion of the middle layer comprised 1000 ppm Cobalt salt, 1000 ppm BBP3 and was exposed for 1.6 minutes to 254 nm UV at 1 inch to receive 800 mJ/cm². The oxygen scavenging was tested with 300 cc 1% $O_2$ at 4° C. The results are given below in table 5. These results are plotted along with the results of Example 6 in FIG. 2, which graphically plots % oxygen in headspace against time (days). The oxygen scavenging uptake capacity is based on the total weight of the three-layer film.

TABLE 5

| Time (days) | $O_2$ Meas. Vol % | $O_2$ Meas. Vol, ml | Vol-$O_2$ Used ml | $O_2$ Uptake ml/g | $O_2$ Uptake Avg Rate cc/m²/day | Instant Rate cc/ m²/day | $O_2$ Capacity cc/m²/mil |
|---|---|---|---|---|---|---|---|
| 0.0 | 1.04 | 3.12 | 0.00 | 0.00 | 0.00 | 0.00 | 0.00 |
| 0.8 | 0.74 | 2.18 | 0.89 | 1.84 | 57.93 | 57.93 | 44.25 |
| 1.9 | 0.46 | 1.33 | 1.70 | 3.54 | 45.85 | 37.36 | 84.85 |
| 3.0 | 0.29 | 0.83 | 2.18 | 4.54 | 36.87 | 21.87 | 109.08 |
| 5.8 | 0.14 | 0.39 | 2.60 | 5.42 | 22.46 | 7.41 | 130.08 |
| 7.8 | 0.09 | 0.25 | 2.74 | 5.71 | 17.67 | 3.51 | 136.95 |

Example 9

Headspace Analysis of $O_2$ Scavenging in Dowlex® 3010/EMCM/Dowlex® 3010 Films

Oxygen scavenging analysis was performed using a Mocon HS750 with a headspace volume of 300 cc. The sample tested was a 0.47 g three-layer film with Dowlex® 3010 film for the two outside layers and steam stripped EMCM for the middle layer (50 ppm Irganox 1010)). The thickness of the layers was 0.5/1/0.5+/−0.1 Mil. The oxygen scavenging portion of the middle layer comprised 1000 ppm Cobalt salt, 1000 ppm BBP[3] (a photoinitiator) exposed for 1.6 minutes to 254 nm UV at 1 inch to receive 800 mJ/cm². The oxygen scavenging was tested with 300 cc 1% $O_2$ at 4° C. These results are plotted along with the results of Example 7 in FIG. 2, which graphically plots % oxygen in headspace against time (days).

Example 10

Figure 3:
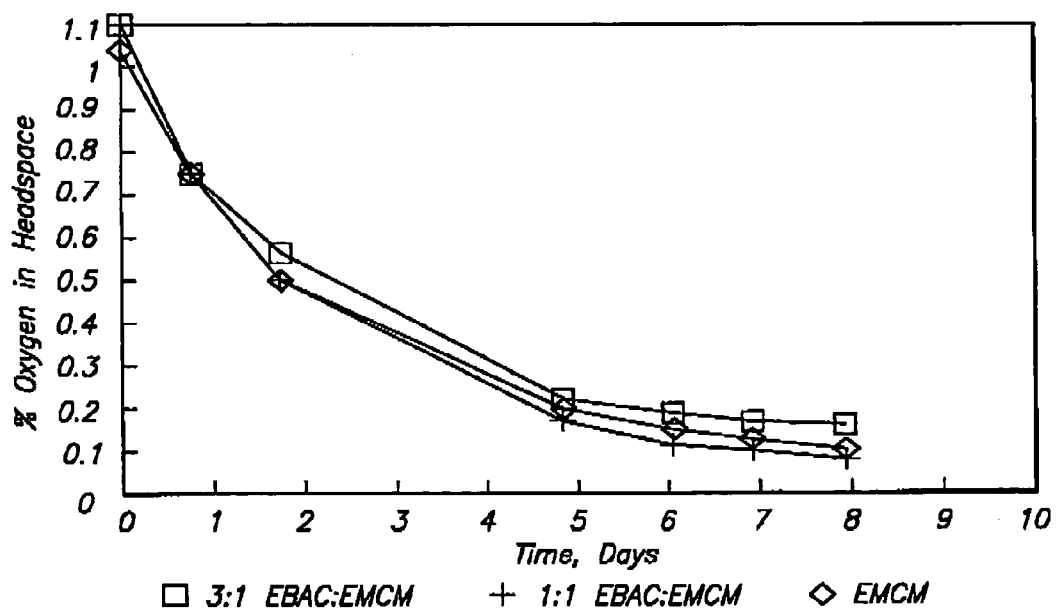
FIG. 3 is a graph comparatively plotting percent oxygen in headspace at 4° C. (initially at 1% oxygen) against time in days for an EMCM film and two EBAC blended EMCM films, one of them having 3:1 EBAC:EMCM and one of them having 1:1 EBAC:EMCM.

Headspace Analysis of $O_2$ Scavenging in Dowlex® 3010/EBAC:EMCM/Dowlex® 3010 Films Oxygen scavenging analysis was performed using a Mocon HS750 with a headspace volume of 300 cc. The sample tested was a 0.45 g three-layer film with Dowlex® 3010 film for the two outside layers and 3:1 EBAC (ethylene/butyl acrylate copolymer):EMCM (ethylene/methyl acrylate/cyclohexenyl methyl acrylate) for the middle layer (50 ppm Irganox® 1010)). The thickness of the layers was 0.5/1/0.5+/−0.1 Mil. The oxygen scavenging portion of the middle layer comprised 1000 ppm of Cobalt salt, 1000 ppm BBP[3] was exposed for 1.6 minutes to 254 nm UV at 1 inch to receive 800 mJ/cm². The oxygen scavenging was tested with 300 cc 1% $O_2$ at 4° C. These results are plotted along with the results of Example 8 in FIG. 3, which graphically plots % oxygen in headspace against time (days).

Example 11

Headspace Analysis of $O_2$ Scavenging in Dowlex® 3010/EBAC:EMCM/Dowlex® 3010 Films Oxygen scavenging analysis was performed using a Mocon HS750 with a headspace volume of 300 cc. The sample tested was a 0.47 g three-layer film with Dowlex®) 3010 film for the two outside layers and 1:1 EBAC:EMCM for the middle layer (50 ppm Irganox®1010)). The thickness of the layers was 0.5/1/0.5+/−0.1 Mil. The oxygen scavenging portion of the middle layer comprised 1000 ppm Cobalt Oleate salt, 1000 ppm BBP[3] exposed for 1.6 minutes at 254 nm UV at 1 inch to receive 800 mJ/cm². The oxygen scavenging was tested with 300 cc 1% $O_2$ at 4° C. The results of the tests are given below in Table 6. These results are plotted along with the results of Example 9 in FIG. 3, which graphically plots % oxygen in headspace against time (days). The oxygen scavenging uptake capacity is based on the total weight of the 3-layer film.

TABLE 6

| Time (days) | Headspace $O_2$ (Vol %) | Headspace $O_2$ (Vol, ml) | Vol-$O_2$ Used (ml) | $O_2$ Uptake (ml/g) | $O_2$ Uptake Avg Rate (cc/m² · day) | Instant Rate (cc/m² · day) | $O_2$ Capacity cc/m² |
|---|---|---|---|---|---|---|---|
| 0.0 | 1.09 | 3.27 | 0.00 | 0.00 | 0.00 | 0.00 | 0.00 |
| 0.8 | 0.74 | 2.18 | 1.03 | 2.20 | 63.00 | 63.00 | 51.63 |
| 1.8 | 0.50 | 1.45 | 1.73 | 3.68 | 48.52 | 36.18 | 86.43 |
| 4.8 | 0.17 | 0.48 | 2.67 | 5.8 | 27.73 | 15.51 | 133.45 |
| 6.1 | 0.12 | 0.34 | 2.81 | 5.98 | 23.17 | 5.60 | 140.45 |
| 6.9 | 0.10 | 0.28 | 2.86 | 6.09 | 20.84 | 3.40 | 143.20 |
| 7.9 | 0.08 | 0.22 | 2.92 | 6.21 | 18.46 | 2.62 | 145.90 |

Example 12

Figure 4:
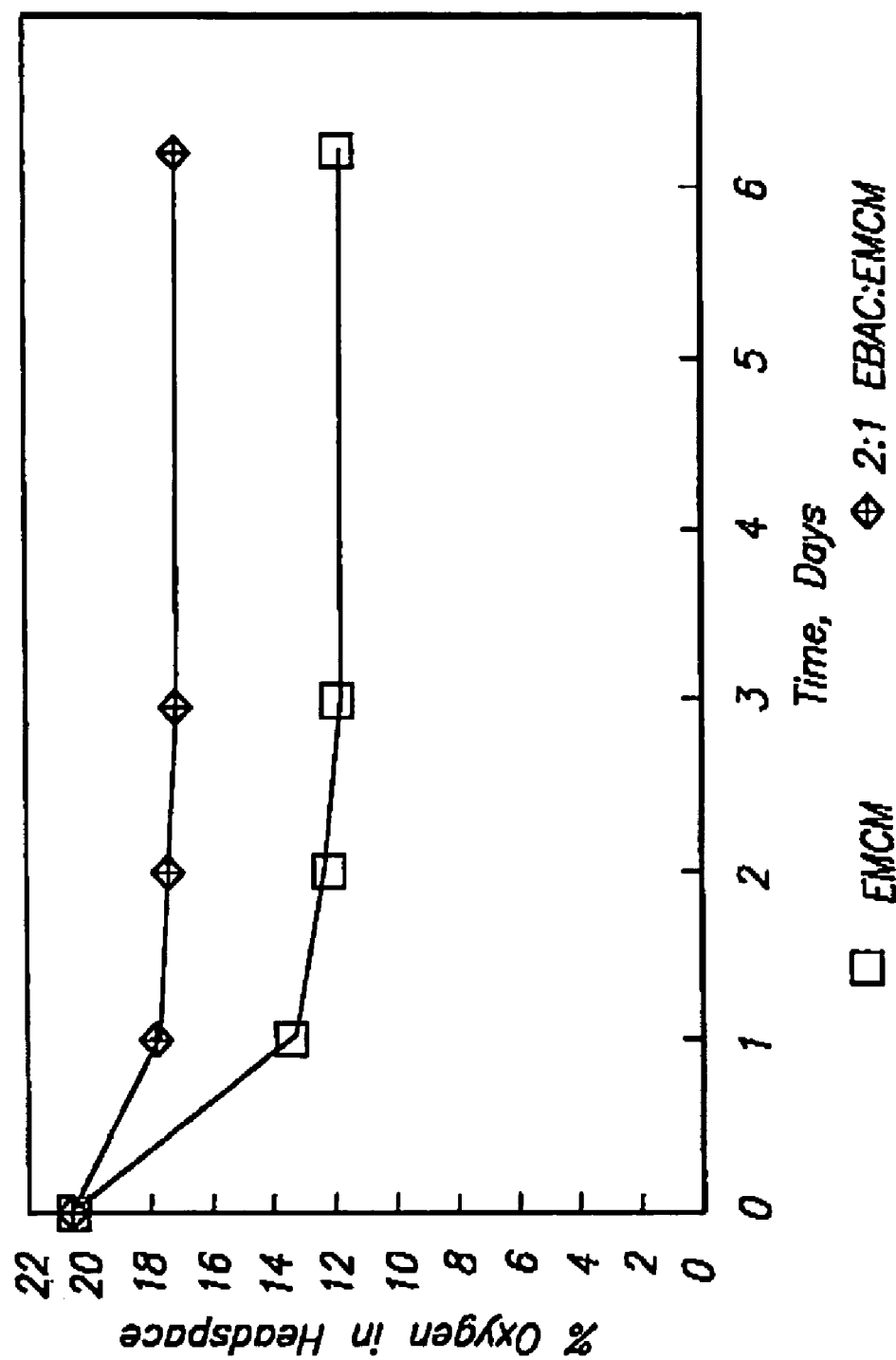
FIG. 4 is a graph comparatively plotting the oxygen scavenging rates and capacities at 25° C. in which the initial headspace oxygen was 21% (air) for an EMCM film and a 2:1 EBAC:EMCM film.

Headspace Analysis of $O_2$ Scavenging Capacity in Dowlex® 3010/EMCM/Dowlex® 3010 Films Oxygen scavenging analysis was performed using a Mocon HS750 with a headspace volume of 300 cc. The sample tested was a 0.47 g three-layer film with Dowlex® 3010 film for the two outside layers and steam stripped EMCM for the middle layer (50 ppm Irganox®1010)). The thickness of the layers was 0.5/1/0.5+/−0.1 Mil. The oxygen scavenging portion of the middle layer comprised 1000 ppm Cobalt Oleate salt, 1000 ppm BBP[3] exposed for 1.6 minutes to 254 nm UV at 1 inch to receive 800 mJ/cm². The oxygen scavenging was tested with 300 cc air at room temperature. The $O_2$ uptake capacity is based on total weight of the 3-layer film. The results of the tests are given below in Table 7. These results are plotted along with the results of Example 12 in FIG. 4, which graphically plots % oxygen in headspace against time (days).

TABLE 7

| Time (days) | Head- space $O_2$ (Vol %) | $O_2$ Vol, (ml) | Vol-$O_2$ Used (ml) | $O_2$ Uptake (ml/g) | $O_2$ Uptake Avg Rate (cc/m² · day) | Instant Rate (cc/m² · day) | $O_2$ Capacity (cc/m²) |
|---|---|---|---|---|---|---|---|
| 0.0 | 20.60 | 61.80 | 0.00 | 0.00 | 0.0 | 0.0 | 0.0 |
| 1.0 | 13.40 | 39.53 | 21.24 | 43.35 | 1058 | 1058 | 1062 |
| 2.0 | 12.20 | 35.38 | 24.72 | 50.45 | 616 | 173 | 1236 |
| 3.0 | 11.80 | 33.63 | 25.86 | 52.78 | 437 | 60 | 1293 |
| 6.2 | 11.80 | 33.04 | 25.86 | 52.78 | 207 | 0.0 | 1293 |

Example 13

Headspace Analysis of $O_2$Scavenging Capacity in Dowlex® 3010/EBAC:EMCM/Dowlex® 3010 Films Oxygen scavenging analysis was performed using a Mocon HS750 with a headspace volume of 300 cc. The sample tested was a 0.45 g three-layer film with Dowlex® 3010 film for the two outside layers and 2:1 EBAC:EMCM for the middle layer (50 ppm Irganox 1010)). The width of the layers was 0.5/1/0.5+/−0.1 Mil. The oxygen scavenging portion of the middle layer comprised 1000 ppm of Cobalt salts, 1000 ppm BBP[3] exposed for 1.6 minutes to 254 nm UV at 1 inch to receive 800 mJ/cm². The oxygen scavenging was tested with 300 cc air at room temperature. The $O_2$ uptake capacity is based on total weight of the 3-layer film. The results of the tests are given below in Table 8. These results are plotted along with the results of Example 9 in FIG. 4, which graphically plots % oxygen in headspace against time (days).

TABLE 8

| Time (days) | Head- space $O_2$ (Vol %) | Head- space $O_2$ Vol, (ml) | Vol-$O_2$ Used (ml) | $O_2$ Uptake (ml/g) | $O_2$ Uptake Avg Rate (cc/m² · day) | Instant Rate (cc/m² · day) | $O_2$ Capacity (cc/m²) |
|---|---|---|---|---|---|---|---|
| 0.0 | 20.60 | 61.80 | 0.00 | 0.00 | 0.0 | 0.0 | 0.0 |
| 1.0 | 17.70 | 52.21 | 8.56 | 18.20 | 426 | 426 | 428 |
| 2.0 | 17.40 | 50.46 | 9.43 | 20.05 | 235 | 43 | 471 |
| 3.0 | 17.10 | 48.74 | 10.28 | 21.87 | 174 | 45 | 514 |
| 6.2 | 17.10 | 47.88 | 10.28 | 21.87 | 83 | 0.0 | 514 |

Example 14

Taste Preference Test

The organoleptic quality of a film containing EMCM as the scavenging resin in a multi-layer oxygen scavenging packaging structure was evaluated and compared with an SBS (styrene/butadiene/styrene)-based oxygen scavenging packaging structure. Films were triggered with 800 mJ/cm² of 254 nm UV. Packages containing ca. 200 ml of water were made and vacuum/gas flushed to obtain a gas composition of 1% $O_2$:99% $N_2$. Packages were stored at 40° F. for seven days prior to taste testing. A forced preference double blind Triangle taste test was carried out on water extracts of the EMCM-based and SBS-based films.

Sensory results indicated that there was a significant difference (24 out of 28 respondents) between the EMCM-based and SBS-based structures. All 24 respondents who correctly identified the odd sample in the single test preferred the taste of the water packaged in EMCM over SBS. As shown in Table 9, Day 4 scavenging rates of the EMCM-based structures were lower than the SBS counterpart. On Day 4, both structures had significant oxidation and the obvious difference in flavor perception was attributed to the fewer and less objectionable by-products (fragments after oxidation of EMCM) of the EMCM oxygen scavenging system.

In a second forced preference triangle taste test, water samples in EMCM-based scavenging structures were tested against water samples packaged in a standard barrier laminate film (R660B manufactured by Cryovac Division of Sealed Air Corporation). The packaged water extract samples were submitted to a sensory panel for forced preference double blind taste testing. Samples were tested after 8 days of scavenging. A significant difference in the taste was found between the samples packaged in the EMCM and the control packages. Surprisingly, the preference was towards the EMCM structure. Open comments stated that there was no off-flavor (normally associated with the SBS-based oxygen scavenging films) in the EMCM samples and that EMCM was "pretty close in taste to the control." Headspace oxygen levels reached by the EMCM structure were ca. 0.2% (down from 1%) at Day 8. Scavenging results of the EMCM film used during this test are also listed in Table 9.

TABLE 9

Oxygen Scavenging Packaging Films

| Film Sample | Average Rate (cc/m² · day) Mean | Average Rate (cc/m² · day) St. dev | Induction Period (days) | Peak Instantaneous Rate avg.[c] (cc/m² · day) Mean | Peak Instantaneous Rate (cc/m² · day) St. dev. |
|---|---|---|---|---|---|
| SBS Film | 51.0[a] | 7.8 | <1 | 88.4 (1) | 14.1 |
| 1st Sensory test EMCM | 41.6[a] | 5.3 | <1 | 68.6 (2) | 11.4 |
| 2nd Sensory Test EMCM | 30.5[b] | 5.9 | <1 | 83.6 (2–3) | 19.4 |

[a]Rate at 4 days.
[b]Rate at 8 days.
[c]Time to reach peak rate in days.

Example 15

Taste Preference Test

Oxygen scavenging test films, 5 cm×20 cm, were irradiated with 800 mJ/cm² ultraviolet (254 nm) and heat tacked to the top of the test pouches (one per pouch). The pouches (16 cm×19 cm) were made from laminated barrier film specifically designed to be oxygen impermeable. 21 gram slices of freshly sliced turkey roll were put into sterilized 9 cm petri dishes (one per dish). The dishes were, in turn, placed into the barrier pouches (one per pouch). The pouches were heat sealed, filled with 300 cc 1% oxygen/ 99% nitrogen gas, and stored at 4° C. for the duration of the test.

Two types of oxygen scavenging polymers were compared in the test against a control (barrier pouch alone, no oxygen scavenger). The oxygen scavenging films were each three layer (ABA) structures in which the outer, "A", layer was 0.5 mil thick LLDPE, and the middle, "B", layer was 1.0 mil thick oxygen scavenging polymer (compounded with 1000 ppm cobalt (as oleate) and 1000 ppm of a photoinitiator (BBP[3]). The headspace oxygen for the pouches is shown in Table 10. Both of the test oxygen scavenging films scavenged more oxygen than the packaged turkey itself.

TABLE 10

| Oxygen scavenging layer composition | Initial headspace oxygen, % | Headspace oxygen after 3 days @ 4° C., % |
|---|---|---|
| none | 1.02 | 0.72 |
| SBS | 1.00 | 0.08 |
| EMCM | 1.02 | 0.17 |

Figure 5:
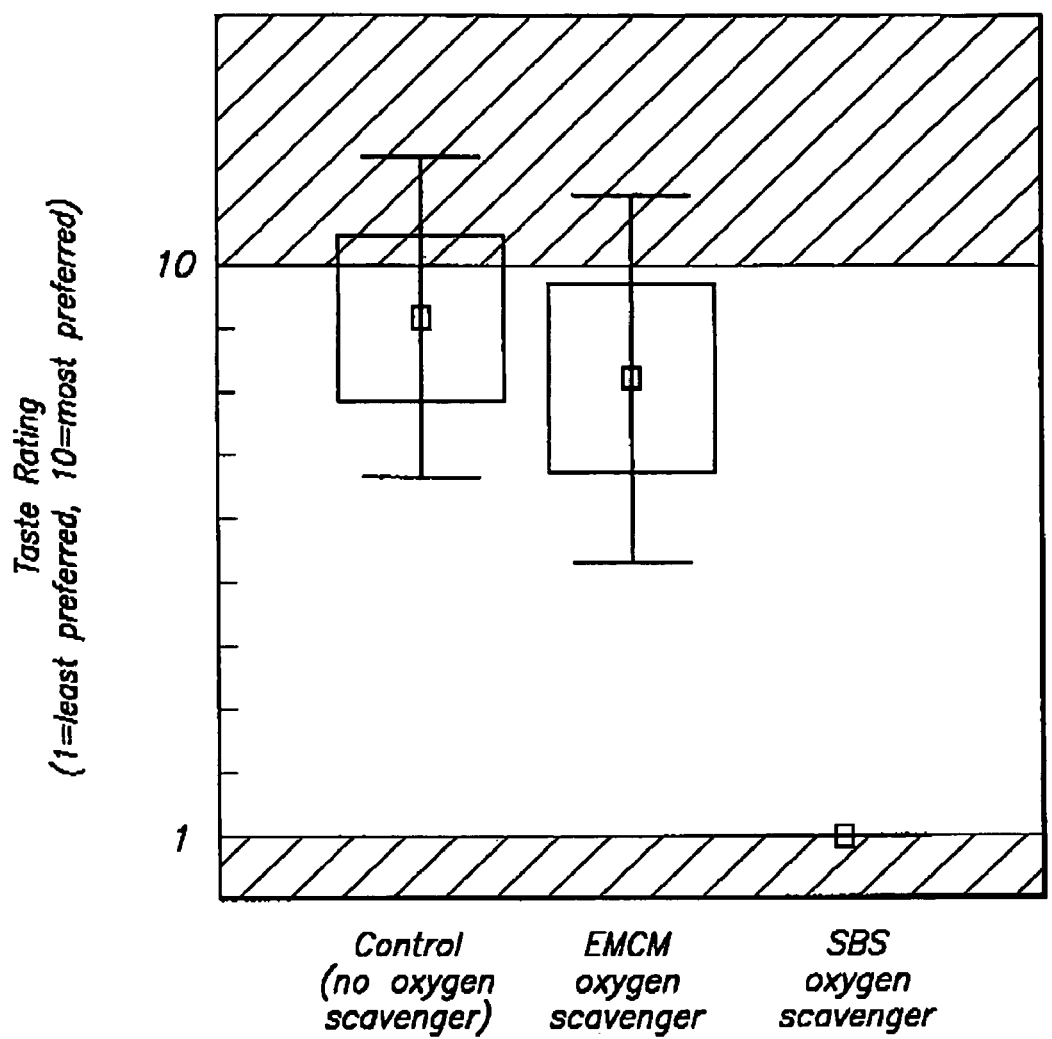
FIG. 5 is a graph showing the taste ratings in a comparative taste test between food stored in two oxygen scavenging packages (EMCM and SBS) and a control package (no oxygen scavenger).

Taste panelists were instructed to force rank the samples according to their taste preference; assigning the least preferred sample a score of 1, and the most preferred sample a score of 10. As is shown in FIG. 5, the panelists found the taste of the turkey packaged in control and the EMCM pouches statistically equivalent. The turkey packaged in the SBS pouch was found significantly less preferred than either the control or the EMCM.

Example 16

Polymerization of EMCM via high pressure autoclave reactor proceeds in a steady-state continuous manner as follows. Ethylene is circulated at a rate of 10,000–14,000 lb/hr by a hypercompressor which compresses the ethylene to 16,500–22,500 psig. The compressed ethylene is injected into the autoclave reactor in various positions along the reactor wall associated with the zone divisions made by the reactor internals. Simultaneously, acrylate of cyclohexene-1-methanol (CHAA) comonomer is injected into either the first zone or the first and second zones of the reactor at a rate sufficient to produce a copolymer containing from 5 to 40% CHAA, more typically 10%–25% by weight. The reaction is initiated by injection of a solution of di-tert butyl peroxypivalate in an aliphatic solvent which also functions as a chain transfer agent. The initiator is injected at a rate to provide approximately 10–20 ppm (wt) of initiator in the compressed ethylene.

The locations of the CHAA injection are critical to the polymer being produced, as is shown in U.S. Pat. No. 5,571,878 which details the effects of acrylate injection location on the polymerization of ethylene and an alkyl acrylate comonomer in a high pressure system.

The resultant polymer exits the reactor at a rate of 1000–2000 lb/hr in a multi-phase solution in ethylene to a high pressure separator. The pressure of the product is reduced adiabatically through a valve to 2,000 psig pressure and the unreacted ethylene and unreacted CHAA are recompressed to reactor pressure and reinjected into the reactor for further polymerization. Additional ethylene is added to the cycle via a primary compressor which compresses the ethylene from pipeline pressure to the suction pressure of the hypercompressor at a rate equal to the polymer production rate.

From the high pressure separator, the polymer is reduced in pressure to 4–10 psig for further removal of unreacted ethylene and unreacted comonomer. The polymer is fed into a melt pumping device (either an extruder or a gear pump) and is pelletized and transferred for packaging and shipment.

Although a few embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A compound, comprising a polymeric backbone, cyclic olefinic pendent groups and linking groups linking the olefinic pendent groups to the polymeric backbone, and comprising the formula (II) as follows:

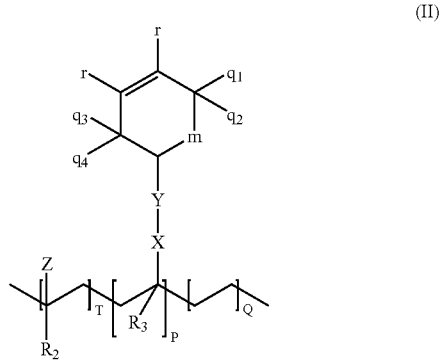

wherein P+T+Q is 100 mol % of the compound; P, T, and Q are each greater than 0 mol % of the compound; Z is selected from the group consisting of an aryl group; —(C═O)OR$_1$; —O(C═O)R$_1$; and an alkyl aryl group:

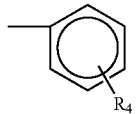

where R$_4$ is selected from the group consisting of –CH$_3$, ethyl, and hydrogen; R$_1$ is selected from the group consisting of hydrogen, methyl, ethyl, —C$_3$H$_7$ and —C$_4$H$_9$; R$_2$ and R$_3$ are selected from the group consisting of hydrogen and methyl; X is selected from the group consisting of —O—, —NH—, —(C═O)O—, —(C═O)NH—, —(C═O)S—, —O(C═O)— and —(CHR)$_L$—; L is an integer in the range from 1 to 6; Y is —(CHR)$_n$—, where n is an integer in the range from 0 to 12, R being selected from the group consisting of hydrogen, methyl and ethyl; where q$_1$, q$_2$, q$_3$, q$_4$, and r are selected from the group consisting of hydrogen, methyl, and ethyl; and where m is —(CH$_2$)$_n$— and where n is an integer in the range from 0 to 4; and wherein when r is hydrogen, at least one of q$_1$, q$_2$, q$_3$ and q$_4$ is hydrogen.

2. The compound of claim 1, wherein the polymeric backbone comprises monomers selected from the group consisting of ethylene and styrene.

3. The compound of claim 1, wherein the cyclic olefinic pendent groups are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, 0,1,2,5-trimethyl cyclohexene-4-propylene radical, cyclopentene-4-methylene radical, 1-methyl cyclopentene-4-methylene radical, 3-methyl cyclopentene-4-methylene radical, 1,2-dimethyl cyclopentene-4-methylene radical, 3,5-dimethyl cyclopentene-4-methylene radical, 1,3-dimethyl cyclopentene-4-methylene radical, 2,3-dimethyl cyclopentene-4-methylene radical, 1,2,3-trimethyl cyclopentene-4-methylene radical, 1,2,3,5-tetramethyl cyclopentene-4-methylene radical, cyclopentene-4-ethylene radical, 1-methyl cyclopentene-4-ethylene radical, 3-methyl cyclopentene-4-ethylene radical, 1,2-dimethyl cyclopentene-4-ethylene radical, 3,5-dimethyl cyclopentene-4-ethylene radical, 1,3-dimethyl cyclopentene-4-ethylene radical, 2,3-dimethyl cyclopentene-4-ethylene radical, 1,2,3-trimethyl cyclopentene-4-ethylene radical, 1,2,3,5-tetramethyl cyclopentene-4-ethylene radical, cyclopentene-4-propylene radical, 1-methyl cyclopentene-4-propylene radical, 3-methyl cyclopentene-4-propylene radical, 1,2-dimethyl cyclopentene-4-propylene radical, 3,5-dimethyl cyclopentene-4-propylene radical, 1,3-dimethyl cyclopentene-4-propylene radical, 2,3-dimethyl cyclopentene-4-propylene radical, 1,2,3-trimethyl cyclopentene-4-propylene radical, and 1,2,3,5-tetramethyl cyclopentene-4-propylene radical.

4. The compound of claim 1, wherein the compound is an ethylene/methyl acrylate/cyclohexenyl methyl acrylate terpolymer.

5. The compound of claim 1, wherein the cyclic olefinic pendent groups are grafted onto the linking groups of the polymeric backbone by an esterification, transesterification, amidation or transamidation reaction.

6. The compound of claim 5, wherein the esterification, transesterification, amidation or transamidation reaction is a solution reaction or a reactive extrusion.

7. The compound of claim 5, wherein the esterification, transesterification, amidation or transamidation reaction is catalyzed by a catalyst selected from the group consisting of strong non-oxidizing acids, tertiary amines, Group I alkoxides, Group IVB alkoxides, and Group IVA organometallics.

8. The compound of claim 7, wherein the catalyst is selected from a group consisting of toluene sulfonic acid, sodium methoxide, tetrabutyl titanate, tetraisopropyl titanate, tetra-n-propyl-titanate, tetraethyl titanate, 2-hydroxypyridine and dibutyltin dilaurate.

9. An oxygen scavenging composition, comprising a compound comprising a polymeric backbone, cyclic olefinic pendent groups, and linking groups linking the olefinic pendent groups to the polymeric backbone, and a transition metal catalyst;

wherein the transition metal catalyst is a metal salt, and the compound comprises the formula (II) as follows:

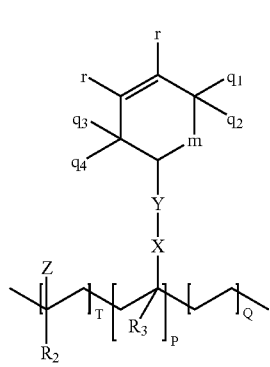

(II)

wherein P+T+Q is 100 mol % of the compound; P, T, and Q are each greater than 0 mol % of the compound; Z is selected from the group consisting of an aryl group; —(C=O)OR$_1$; —O(C=O)R$_1$; and an alkyl aryl group:

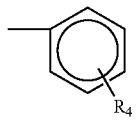

where R$_4$ is selected from the group consisting of —CH$_3$, ethyl, and hydrogen; R$_1$ is selected from the group consisting of hydrogen, methyl, ethyl, —C$_3$H$_7$ and —C$_4$H$_9$; R$_2$ and R$_3$ are selected from the group consisting of hydrogen and methyl; X is selected from the group consisting of —O—, —NH—, —(C=O)O—, —(C=O)NH—, —(C=O)S—, —O(C=O)— and —(CHR)$_L$—; L is an integer in the range from 1 to 6; Y is —(CHR)$_n$—, where n is an integer in the range from 0 to 12, R being selected from the group consisting of hydrogen, methyl and ethyl; where q$_1$, q$_2$, q$_3$, q$_4$, and r are selected from the group consisting of hydrogen, methyl, and ethyl; and where m is —(CH$_2$)$_n$— and where n is an integer in the range from 0 to 4; and wherein when r is hydrogen, at least one of q$_1$, q$_2$, q$_3$ and q$_4$ is hydrogen.

10. A composition according to claim 9, wherein the polymeric backbone is ethylenic and the linking groups are selected from the group consisting of:

—O—(CHR)$_n$—; —(C=O)—O—(CHR)$_n$—;
—NH—(CHR)$_n$; —O—(C=O)—(CHR)$_n$—;

—(C=O)—NH—(—CHR)$_n$—; and —(C—O)—O—CHOH—CH$_2$—O—;

wherein R is hydrogen or an alkyl group selected from the group consisting of methyl, ethyl propyl and butyl groups and where n is an integer in the range from 1 to 12.

11. The composition of claim 9, wherein the polymeric backbone comprises monomers selected from the group consisting of ethylene and styrene.

12. The composition of claim 9, wherein the cyclic olefinic pendent groups are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-methyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, 1,2,5-trimethyl cyclohexene-4-propylene radical, cyclopenten-4-methylene radical, 1-methyl cyclopentene-4-methylene radical, 3-methyl cyclopentene-4-methylene radical, 1,2-dimethyl cyclopentene-4-methylene radical, 3,5-dimethyl cyclopentene-4-methylene radical, 1,3-dimethyl cyclopentene-4-methylene radical, 2,3-dimethyl cyclopentene-4-methylene radical, 1,2,3-trimethyl cyclopentene-4-methylene radical, 1,2,3,5-tetramethyl cyclopentene-4-methylene radical, cyclopentene-4-ethylene radical, 1-methyl cyclopentene-4-ethylene radical, 3-methyl cyclopentene-4-ethylene radical, 1,2-dimethyl cyclopentene-4-ethylene radical, 3,5-dimethyl cyclopentene-4-ethylene radical, 1,3-dimethyl cyclopentene-4-ethylene radical, 2,3-dimethyl cyclopentene-4-ethylene radical, 1,2,3-trimethyl cyclopentene-4-ethylene radical, 1,2,3,5-tetramethyl cyclopentene-4-ethylene radical, cyclopentene-4-propylene radical, 1-methyl cyclopentene-4-propylene radical, 3-methyl cyclopentene-4-propylene radical, 1,2-dimethyl cyclopentene-4-propylene radical, 3,5-dimethyl cyclopentene-4-propylene radical, 1,3-dimethyl cyclopentene-4-propylene radical, 2,3-dimethyl cyclopentene-4-propylene radical, 1,2,3-trimethyl cyclopentene-4-propylene radical, and 1,2,3,5-tetramethyl cyclopentene-4-propylene radical.

13. The composition of claim 9, wherein the compound is an ethylene/methyl acrylate/cyclohexenyl methyl acrylate terpolymer.

14. The composition of claim 9, wherein odor and taste characteristics of products packaged with material comprised of the composition are not adulterated as a result of oxidation of the composition.

15. The composition of claim 9, wherein there is no significant fragmentation of the olefinic pendent groups and linking groups from the polymeric backbone as a result of oxidation of the composition.

16. The composition of claim 9, further comprising at least one triggering material to enhance initiation of oxygen scavenging.

17. The composition of claim 9, wherein the cyclic olefinic pendent groups are grafted onto the linking groups of the polymeric backbone by a esterification, transesterification, amidation or transamidation reaction.

18. The composition of claim 17, wherein the esterification, transesterification, amidation or transamidation reaction is a solution reaction or a reactive extrusion.

19. The composition of claim 17, wherein the esterification, transesterification, amidation or transamidation reaction is catalyzed by a catalyst selected from the group consisting of strong non-oxidizing acids, tertiary amines, Group I alkoxides, Group IVB alkoxides, and Group IVA organometallics.

20. The composition of claim 19, wherein the catalyst is selected from a group consisting of toluene sulfonic acid, sodium methoxide, tetrabutyl titanate, tetraisopropyl titanate, tetra-n-propyl-titanate, tetraethyl titanate, 2-hydroxypyridine and dibutyltin dilaurate.

21. The composition of claim 9, wherein the metal in the metal salt is cobalt.

22. The composition according to claim 21, wherein the metal salt is selected from the group consisting of cobalt neodecanoate, cobalt 2-ethylhexanoate, cobalt oleate and cobalt stearate.

23. The composition of claim 22, wherein the triggering material is a photo initiator.

24. An article of manufacture suitable as a container, the container inhibiting oxidation of contents of the container by removing oxygen from the container and by inhibiting ingress of oxygen into the container from outside the container,
wherein the article comprises an oxygen scavenging composition which comprises:
(a) a compound comprising a polymeric backbone, cyclic olefinic pendant groups, and linking groups linking the olefinic pendant groups to the backbone, and comprising the formula (II) as follows:

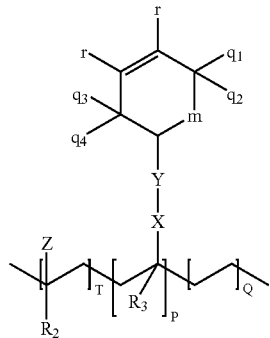

(II)

wherein P+T+Q is 100 mol % of the compound; P, T, and Q are each greater than 0 mol % of the compound; Z is selected from the group consisting of an aryl group; —(C=O)OR$_1$; —O(C=O)R$_1$; and an alkyl aryl group:

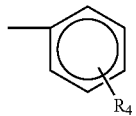

where R$_4$ is selected from the group consisting of —CH$_3$, ethyl, and hydrogen; R$_1$ is selected from the group consisting of hydrogen, methyl, ethyl, —C$_3$H$_7$ and —C$_4$H$_9$; R$_2$ and R$_3$ are selected from the group consisting of hydrogen and methyl; X is selected from the group consisting of —O—, —NH—, —(C=O)O—, —(C=O)NH—, —(C=O)S—, —O(C=O)— and —(CHR)$_L$, L is an integer in the range from 1 to 6; Y is —(CHR)$_n$—, where n is an integer in the range from 0 to 12, R being selected from the group consisting of hydrogen, methyl and ethyl; where q$_1$, q$_2$, q$_3$, q$_4$, and r are selected from the group consisting of hydrogen, methyl, and ethyl; and where m is —(CH$_2$)$_n$— and where n is an integer in the range from 0 to 4; and wherein when r is hydrogen, at least one of q$_1$, q$_2$, q$_3$ and q$_4$ is hydrogen; and
(b) a transition metal catalyst.

25. The article of manufacture of claim 24, wherein
the polymeric backbone is ethylenic and the linking groups are selected from the group consisting of:

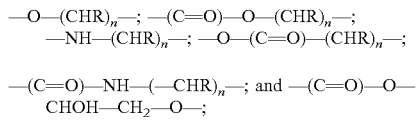

wherein R is hydrogen or an alkyl group selected from the group consisting of methyl, ethyl propyl and butyl groups and where n is an integer in the range from 1 to 12.

26. The article of manufacture of claim 24, wherein
the polymeric backbone comprises monomers selected from the group consisting of ethylene and styrene.

27. The article of manufacture of claim 19, wherein the cyclic olefinic pendent groups are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, 1,2,5-trimethyl cyclohexene-4-propylene radical, cyclopentene-4-methylene radical, 1-methyl cyclopentene-4-methylene radical 3-methyl cyclopentene-4-methylene radical, 1,2-dimethyl cyclopentene-4-methylene radical, 3,5-dimethyl cyclopentene-4-methylene radical, 1,3-dimethyl cyclopentene-4-methylene radical, 2,3-dimethyl cyclopentene-4-methylene radical, 1,2,3-trimethyl cyclopentene-4-methylene radical, 1,2,3,5-tetramethyl cyclopentene-4-methylene radical, cyclopentene-4-ethylene radical, 1-methyl cyclopentene-4-ethylene radical, 3-methyl cyclopentene-4-ethylene radical, 1,2-dimethyl cyclopentene-4-ethylene radical, 3-dimethyl cyclopentene-4-ethylene radical, 1,3-dimethyl cyclopentene-4-ethylene radical, 2,3-dimethyl cyclopentene-4-ethylene radical, 1,2,3-trimethyl cyclopentene-4-ethylene radical, 1,2,3,5-tetramethyl cyclopentene-4-ethylene radical, cyclopentene-4-propylene radical, 1-methyl cyclopentene-4-propylene radical, 3-methyl cyclopentene-4-propylene radical, 1,2-dimethyl cyclopentene-4-propylene radical, 3,5-dimethyl cyclopentene-4-propylene radical, 1,3-dimethyl cyclopentene-4-propylene radical, 2,3-dimethyl cyclopentene-4-propylene radical, 1,2,3-trimethyl cyclopentene-4-propylene radical, and 1,2,3,5-tetramethyl cyclopentene-4-propylene radical.

28. The article of manufacture of claim 19, wherein the compound is an ethylene/methyl acrylate/cyclohexenyl methyl acrylate terpolymer.

29. The article of manufacture of claim 24, wherein odor and taste characteristics of products packaged with material comprised of the composition are not adulterated as a result of oxidation of the composition.

30. The article of manufacture of claim 24, wherein there is no significant fragmentation of the olefinic pendent groups and linking groups from the polymeric backbone as a result of oxidation of the composition.

31. The article of manufacture of claim 24, wherein the cyclic olefinic pendent groups are grafted onto the linking groups of the polymeric backbone by a esterification, transesterification, amidation or transamidation reaction.

32. Previously presented) The article of manufacture of claim 31, wherein the esterification, transesterification, amidation or transamidation reaction is a solution reaction or a reactive extrusion.

33. The article of manufacture of claim 31, wherein the esterification, transesterification, amidation or transamidation reaction is catalyzed by a catalyst selected from the group consisting of strong non-oxidizing acids, tertiary amines, Group I alkoxides, Group IVB alkoxides, and Group IVA organometallics.

34. The article of manufacture of claim 33, wherein the catalyst is selected from the group consisting of toluene sulfonic acid, sodium methoxide, tetrabutyl titanate, tetraisopropyl titanate, tetra-n-propyl-titanate, tetraethyl titanate, 2-hydroxy-pyridine and dibutyltin dilaurate.

35. The article of manufacture according to claim 24, wherein the transition metal catalyst is a metal salt.

36. The article of manufacture according to claim 35, wherein the metal in the metal salt is cobalt.

37. The article of manufacture of according to claim 36, wherein the metal salt is selected from the group consisting of cobalt neodecanoate, cobalt 2-ethylhexanoate, cobalt oleate and cobalt stearate.

38. The article of manufacture of claim 24, further comprising at least one triggering material to enhance initiation of oxygen scavenging.

39. The article of manufacture of claim 38, wherein the triggering material is a photoinitiator.

40. The article of manufacture of claim 24 wherein the article is a package.

41. The article of manufacture of claim 40, wherein the package comprises a flexible film having a thickness of at most 10 mil or a flexible sheet having a thickness of at least 10 mil.

42. The article of manufacture of claim 40, wherein the article is a package with a food product located within the package.

43. The article of manufacture of claim 40, wherein the article is a package for packaging a cosmetic, chemical, electronic device, pesticide or a pharmaceutical composition.

44. A multi-layer film comprising the article of manufacture according to claim 24, and at least one additional functional layer.

45. The multi-layer film according to claim 44, wherein at least one additional layer is selected from among oxygen barrier layers, polymeric selective barrier layers, structural layers and heat seal layers.

46. The multi-layer film according to claim 44, wherein the at least one additional layer is an oxygen barrier layer.

47. The multi-layer film according to claim 46, further comprising at least one polymeric selective barrier layer.

48. The multi-layer film according to claim 46, further comprising at least one heat seal layer.

49. The multi-layer film according to claim 46, further comprising at least one structural layer.

50. The article of claim 24, wherein the article is a rigid container, sealing gasket, patch, container closure device, bottle cap, bottle cap insert or molded or thermoformed shape.

51. The article of claim 50, wherein the molded or thermoformed shape is a bottle or tray.

52. A layer suitable for scavenging oxygen, comprising:
(a) a compound comprising a polymeric backbone, cyclic olefinic pendent groups and linking groups linking the olefinic pendent groups to the polymeric backbone, and comprising the formula (II) as follows:

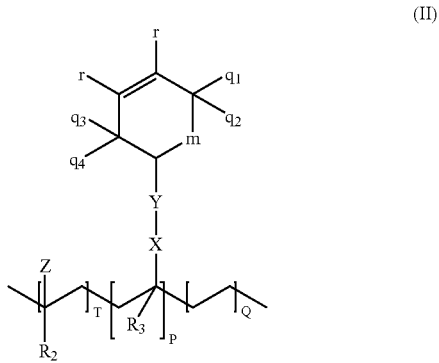

wherein P+T+Q is 100 mol % of the compound; P, T, and Q are each greater than 0 mol % of the compound; Z is selected from the group consisting of an aryl group; —(C═O)OR$_1$; —O(C═O)R$_1$; and an all aryl group;

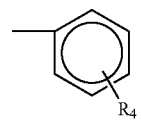

where R$_4$ is selected from the group consisting of —CH$_3$, ethyl, and hydrogen; R$_1$ is selected from the group consisting of hydrogen, methyl, ethyl, —C$_3$H$_7$ and —C$_4$H$_9$; R$_2$ and R$_3$ are selected from the group consisting of hydrogen and methyl; X is selected from the group consisting of —O—, —NH—, —(C═O)O—, —(C═O)NH—, —(C—O)S—, —O(C═O)— and —(CHR)$_L$—; L is an integer in the range from 1 to 6; Y is —(CHR)$_n$—, where n is an integer in the range from 0 to 12, R being selected from the group consisting of hydrogen, methyl and ethyl; where q$_1$, q$_2$, q$_3$, q$_4$, and r are selected from the group consisting of hydrogen, methyl, and ethyl; and where m is —(CH$_2$)$_n$— and where n is an integer in the range from 0 to 4; and wherein when r is hydrogen, at least one of q$_1$, q$_2$, q$_3$ and q$_4$ is hydrogen; and
(b) a transition metal catalyst.

53. The layer of claim 52, wherein odor and taste characteristics of products packaged with material comprised of the layer are not adulterated as a result of oxidation of the layer.

54. The layer of claim 52, wherein there is no significant fragmentation of the olefinic pendent groups and linking groups from the polymeric backbone as a result of oxidation of the layer.

55. An article for packaging wherein the article comprises a layer according to claim 52.

56. A layer according to claim 52, wherein the transition metal catalyst is a metal salt.

57. A layer according to claim 56, wherein the transition metal in the metal salt is cobalt.

58. A layer according to claim 56, wherein the metal salt selected from the group consisting of cobalt neodecanoate, cobalt 2-ethylhexanoate, cobalt oleate and cobalt stearate.

59. A layer according to claim 52, wherein said layer in addition comprises polymeric diluent.

60. A layer according to claim 59, wherein said diluent is a thermoplastic polymer.

61. A layer according to claim 52, wherein said layer is adjacent to one or more additional layers.

62. A layer according to claim 61, wherein at least one additional layer is an oxygen barrier.

63. A layer according to claim 62, wherein said oxygen barrier comprises at least one material selected from the group consisting of poly(ethylene-vinyl alcohol), polyacrylonitrile, poly(vinyl chloride), polyamides, poly(vinylidene dichloride), poly(ethylene terephthalate), silica, metal foil and metalized polymeric films.

64. Previously presented) A layer according to claim 61, wherein one or more of said additional layer or layers is coextruded with said layer.

65. A layer according to claim 61, wherein one or more of said additional layer or layers is laminated onto said layer.

66. A layer according to claim 61, wherein one or more of said additional layer or layers is coated onto said layer.

67. A layer according to claim 61, wherein said layer is flexible.

68. A layer according to claim 61, wherein said layer is transparent.

69. A process of making a polymer material by a process comprising transesterification of an ethylene copolymer with an alcohol comprising a cyclic olefinic group, wherein the polymer material that is produced comprises a polymer backbone, cyclic olefinic pendant groups, and linking groups linking the backbone with the pendant groups;

and comprising the formula (II) as follows:

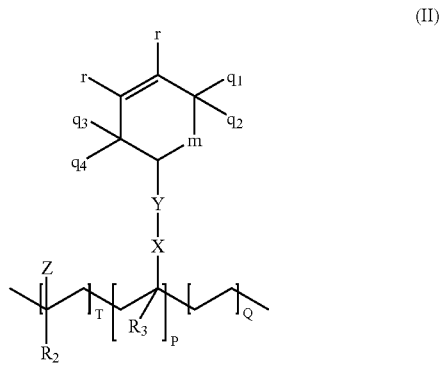

(II)

wherein P+T+Q is 100 mol % of the compound; P, T, and Q are each greater than 0 mol % of the compound; Z is selected from the group consisting of an aryl group; —(C=O)OR$_1$; —O(C=O)R$_1$; and an alkyl aryl group:

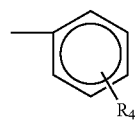

where R$_4$ is selected from the group consisting of —CH$_3$, ethyl, and hydrogen; R$_1$ is selected from the group consisting of hydrogen, methyl, ethyl, —C$_3$H$_7$ and —C$_4$H$_9$; R$_2$ and R$_3$ are selected from the group consisting of hydrogen and methyl; X is selected from the group consisting of —O—, —NH—, —(C=O)O—, —(C=O)NH—, —(C—O)S—, —O(C=O)— and —(CHR)$_L$—; L is an integer in the range from 1 to 6; Y is —(CHR)$_n$—, where n is an integer in the range from 0 to 12, R being selected from the group consisting of hydrogen, methyl and ethyl; where q$_1$, q$_2$, q$_3$, q$_4$, and r are selected from the group consisting of hydrogen, methyl, and ethyl; and where m is —(CH$_2$)$_n$— and where n is an integer in the range from 0 to 4; and wherein when r is hydrogen, at least one of q$_1$, q$_2$, q$_3$ and q$_4$ is hydrogen.

70. The process of claim 69, wherein the reaction is a solution reaction or a reactive extrusion.

71. The process of claim 69, wherein the process comprises the steps of:
  (a) selecting at least one polymer from the group consisting of ethylene/maleic anhydride, ethylene/acrylic acid, ethylene/methacrylic acid, ethylene/methyl acrylate, ethylene/ethyl acrylate, and ethylene/butyl acrylate, and at least one transesterifying compound selected from the group consisting of cyclohexene-4-methanol, 1-methyl cyclohexene-4-methanol, 2-methyl cyclohexene-4-methanol, 5-methyl cyclohexene-4-methanol, 1,2-dimethyl cyclohexene-4-methanol, 1,5-dimethyl cyclohexene-4-methanol, 2,5-dimethyl cyclohexene-4-methanol, 1,2,5-trimethyl cyclohexene-4-methanol, cyclohexene-4-ethanol, 1-methyl cyclohexene-4-ethanol, 2-methyl cyclohexene-4-ethanol, 5-methyl cyclohexene-4-ethanol, 1,2-dimethyl cyclohexene-4-ethanol, 1,5-dimethyl cyclohexene-4-ethanol, 2,5-dimethyl cyclohexene-4-ethanol, 1,2,5-trimethyl cyclohexene-4-ethanol, cyclohexene-4-propanol, 1-methyl cyclohexene-4-propanol, 2-methyl cyclohexene-4-propanol, 5-methyl cyclohexene-4-propanol, 1,2-dimethyl cyclohexene-4-propanol, 1,5-dimethyl cyclohexene-4-propanol, 2,5-dimethyl cyclohexene-4-propanol, 1,2,5-trimethyl cyclohexene-4-propanol, cyclopentene-4-methanol, 1-methyl cyclopentene-4-methanol, 3-methyl cyclopentene-4-methanol, 1,2-dimethyl cyclopentene-4-methanol, 3,5-dimethyl cyclopentene-4-methanol, 1,3-dimethyl cyclopentene-4-methanol, 2,3-dimethyl cyclopentene-4-methanol, 1,2,3-trimethyl cyclopentene-4-methanol, 1,2,3,5-tetramethyl cyclopentene-4-methanol, cyclopentene ethanol, 1-methyl cyclopentene-4-ethanol, 3-methyl cyclopentene-4-ethanol, 1,2-dimethyl cyclopentene-4-ethanol, 3,5-dimethyl cyclopentene-4-ethanol, 1,3-dimethyl cyclopentene-4-ethanol, 2,3-dimethyl cyclopentene-4-ethanol, 1,2,3-trimethyl cyclopentene-4-ethanol, 1,2,3,5-tetramethyl cyclopentene-4-ethanol, cyclopentene-4-propanol, 1-methyl cyclopentene-4-propanol, 3-methyl cyclopentene-4-propanol, 1,2-dimethyl cyclopentene-4-propanol, 3,5-dimethyl cyclopentene-4-propanol, 1,3-dimethyl cyclopentene-4-propanol, 2,3-dimethyl cyclopentene-4-propanol, 1,2,3-trimethyl cyclopentene-4-propanol, and 1,2,3,5-tetramethyl cyclopentene-4-propanol, and combining the at least one polymer and the at least one transesterifying compound;
  (b) heating the polymer and transesterifying compound selected in (a) to form a polymer melt;
  (c) processing the melt in an extruder under transesterification conditions with transesterification catalysts and antioxidants protecting the melt from oxidation during extrusion, so that the polymer melt undergoes exchange of alkyl groups of polymeric esters with cyclic olefin pendent groups; and (d) removing volatile organic products and by-products from the melt.

72. The process of claim 71, wherein the polymeric backbone is ethylenic and the linking groups are selected from the group consisting of:

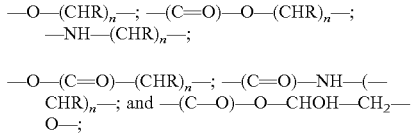

where R is hydrogen or an alkyl group selected from the group consisting of methyl, ethyl, propyl and butyl groups and where n is an integer in the range from 1 to 12.

73. The process of claim 71, wherein the polymeric backbone is ethylenic backbone and the linking group is:

where R is hydrogen or an alkyl group selected from the group consisting of methyl, ethyl, propyl and butyl groups and where n is an integer in the range from 1 to 12.

74. The process of claim 69, further comprising adding to the polymer material a transition metal catalyst.

75. The process of claim 74, wherein the transition metal catalyst is a metal salt.

76. The process of claim 75, wherein the metal in the metal salt is cobalt.

77. The process of claim 75, wherein the metal salt is selected from the group consisting of cobalt neodecanoate, cobalt 2-ethylhexanoate, cobalt oleate and cobalt stearate.

78. Previously presented) The process of claim 69, further comprising adding to the polymer material at least one triggering material to enhance initiation of oxygen scavenging.

79. The process of claim 78, wherein the triggering material is a photoinitiator.

80. The process of claim 69, wherein the transesterification reaction is catalyzed by a catalyst selected from the group consisting of strong non-oxidizing acids, tertiary amines, Group I alkoxides, Group IVB alkoxides, Group IVA organometallics.

81. The process of claim 80, wherein the catalyst is selected from the group consisting of toluene sulfonic acid, sodium methoxide, tetrabutyl titanate, tetraisopropyl titanate, tetra-n-propyl-titanate, tetraethyl titanate, 2-hydroxypyridine and dibutyltin dilaurate.

82. The process of claim 69, wherein the cyclic olefinic pendent groups are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-methyl cyclohexene-4-ethylene radical 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, 1,2,5-trimethyl cyclohexene-4-propylene radical, cyclopentene-4-methylene radical, 1-methyl cyclopentene-4-methylene radical, 3-methyl cyclopentene-4-methylene radical, 1,2-dimethyl cyclopentene-4-methylene radical, 3,5-dimethyl cyclopentene-4-methylene radical, 1,3-dimethyl cyclopentene-4-methylene radical, 2,3-dimethyl cyclopentene-4-methylene radical, 1,2,3-trimethyl cyclopentene-4-methylene radical, 1,2,3,5-tetramethyl cyclopentene-4-methylene radical, cyclopentene-4-ethylene radical, 1-methyl cyclopentene-4-ethylene radical, 3-methyl cyclopentene-4-ethylene radical, 1,2-dimethyl cyclopentene-4-ethylene radical, 3,5-dimethyl cyclopentene-4-ethylene radical, 1,3-dimethyl cyclopentene-4-ethylene radical, 2,3-dimethyl cyclopentene-4-ethylene radical, 1,2,3-trimethyl cyclopentene-4-ethylene radical, 1,2,3,5-tetramethyl cyclopentene-4-ethylene radical, cyclopentene-4-propylene radical, 1-methyl cyclopentene-4-propylene radical, 3-methyl cyclopentene-4-propylene radical, 1,2-dimethyl cyclopentene-4-propylene radical, 3,5-dimethyl cyclopentene-4-propylene radical, 1,3-dimethyl cyclopentene-4-propylene radical, 2,3-dimethyl cyclopentene-4-propylene radical, 1,2,3-trimethyl cyclopentene-4-propylene radical, and 1,2,3,5-tetramethyl cyclopentene-4-propylene radical.

83. The process of claim 82, wherein the polymer is a ethylene/methyl acrylate/cyclohexenyl methyl acrylate terpolymer.

* * * * *